(12) United States Patent
Monte et al.

(10) Patent No.: US 7,180,873 B1
(45) Date of Patent: Feb. 20, 2007

(54) SPREAD SPECTRUM CODE DIVISION DESTINATION ACCESS (SS-CDDA) FOR SATELLITE COMMUNICATION SYSTEM WITH DISTRIBUTED GATEWAYS

(75) Inventors: Paul A. Monte, San Jose, CA (US); Wing-Po Yung, Milpitas, CA (US); Robert A. Wiedeman, Sedalia, CO (US)

(73) Assignee: Globalstar, Inc., Milpitas, CA (US)

( * ) Notice: Subject to any disclaimer, the term of this patent is extended or adjusted under 35 U.S.C. 154(b) by 1231 days.

(21) Appl. No.: 09/680,227

(22) Filed: Oct. 6, 2000
(Under 37 CFR 1.47)

(51) Int. Cl.
*H04B 7/204* (2006.01)

(52) U.S. Cl. ............... 370/325; 370/341; 370/342; 370/441; 370/535; 375/130; 375/141; 375/146; 375/147

(58) Field of Classification Search .......... 370/335, 370/342, 441, 320, 315–319, 535, 341, 325; 375/130, 141, 146, 147
See application file for complete search history.

(56) References Cited

U.S. PATENT DOCUMENTS

| | | | | |
|---|---|---|---|---|
| 5,233,626 A * | 8/1993 | Ames | ...................... | 375/148 |
| 5,303,286 A | 4/1994 | Wiedeman | ................... | 379/59 |
| 5,422,647 A | 6/1995 | Hirshfield et al. | ........... | 342/354 |
| 5,448,623 A | 9/1995 | Wiedeman et al. | ........... | 379/59 |
| 5,526,404 A | 6/1996 | Wiedeman et al. | ........... | 379/60 |
| 5,548,292 A | 8/1996 | Hirshfield et al. | ........... | 342/324 |
| 5,552,798 A | 9/1996 | Dietrich et al. | ............ | 343/893 |
| 5,586,165 A | 12/1996 | Wiedeman | ................... | 379/58 |
| 5,592,481 A | 1/1997 | Wiedeman et al. | ........ | 370/316 |
| 5,594,780 A | 1/1997 | Wiedeman et al. | ........... | 379/59 |
| 5,619,525 A | 4/1997 | Wiedeman et al. | ......... | 375/200 |
| 5,623,269 A | 4/1997 | Hirshfield et al. | .......... | 342/354 |
| 5,664,006 A | 9/1997 | Monte et al. | ............... | 455/405 |
| 5,697,050 A | 12/1997 | Wiedeman | ................. | 455/12.1 |
| 5,758,260 A | 5/1998 | Wiedeman | ................. | 455/12.1 |
| 5,787,336 A | 7/1998 | Hirshfield et al. | ......... | 455/13.4 |
| 5,867,109 A | 2/1999 | Wiedeman | ................... | 340/827 |
| 5,884,142 A | 3/1999 | Wiedeman et al. | ........ | 455/12.1 |
| 5,896,558 A | 4/1999 | Wiedeman | ................. | 455/12.1 |
| 5,999,623 A | 12/1999 | Bowman et al. | .............. | 380/20 |
| 6,067,442 A | 5/2000 | Wiedeman et al. | ........ | 455/13.1 |
| 6,085,067 A | 7/2000 | Gallagher et al. | ......... | 455/13.1 |
| 6,493,376 B1 * | 12/2002 | Harms et al. | ................ | 375/130 |
| 6,756,937 B1 * | 6/2004 | Chang et al. | ............... | 342/354 |
| 6,765,953 B1 * | 7/2004 | Harms et al. | ................ | 375/150 |

\* cited by examiner

*Primary Examiner*—John Pezzlo
*Assistant Examiner*—Inder Pal Mehra
(74) *Attorney, Agent, or Firm*—Karambelas & Associates

(57) ABSTRACT

A code division multiplexing system for a link between components of a satellite communications system is disclosed where, using spread spectrum techniques, channel blocks are each spread by a pre-assigned orthogonal chip-coded waveform. The pre-assigned orthogonal chip-coded waveforms are each preferably chosen according to the origin and destination of the channel block. The channel blocks are each spread over an intermediate frequency and then upconverted such that their spreading bandwidth is equal, or approximately equal, to the allocated bandwidth of the particular link through which they will be transmitted. The channel blocks are spread so they each have the same, or approximately the same, center frequency as the allocated frequency spectrum of the link. A system for de-multiplexing the channel blocks in a link as received by one of the components of a satellite communications system is also disclosed, where the de-multiplexed link signals are then used to generate commands for use within the receiving component or to generate communications in another link.

42 Claims, 18 Drawing Sheets

SPREAD SPECTRUM CODE DIVISION DESTINATION ACCESS (SS-CDDA) FOR SATELLITE COMMUNICATION SYSTEM WITH DISTRIBUTED GATEWAYS

FIELD OF THE INVENTION

This invention relates to broadcast or two-way communications systems, and, in particular, by utilizing spread spectrum code-division multiplexing and de-multiplexing techniques, to multiplexing and de-multiplexing links between a gateway and a satellite, between a satellite and a user terminal, and, optionally, links between satellites.

BACKGROUND OF THE INVENTION

A satellite communications system may be conceptually sub-divided into a space segment, a user segment, and a ground (terrestrial) segment.

As an example, in one type of mobile satellite communication system the satellite segment includes a number of satellites in orbit. The satellites are distributed in orbital planes that are inclined with respect to the equator. Preferably, at least two satellites are in view at any given time from a particular user location between about 70 degree south latitude and about 70 degree north latitude.

The user segment may include a plurality of types of user terminals that are adapted for communication with the satellites. The user terminals include a plurality of different types of fixed and mobile user terminals including, but not limited to, handheld mobile radio-telephones, vehicle mounted mobile radio-telephones, paging/messaging-type devices, and fixed radio-telephones. The user terminals are preferably provided with antennas for bi-directional communication via one or more of the satellites. Communication between the user terminals and the satellites are conveyed by forward (from satellite to user terminal) and return (user terminal to satellite) service links. The user terminals may also be dual use devices that include circuitry for also communicating in a conventional manner with a terrestrial communications system.

The ground segment includes at least one but generally a number of system gateways that communicate with the satellites via feeder links. Communication signals between the system gateways and the satellites are conveyed by forward (gateway to satellite) and return (satellite to gateway) feeder links. Feeder links also convey commands from the system gateways to the satellites and telemetry information from the satellites to the system gateways. The system gateways further function as the principle connecting points to couple the communications payload or transponders of the satellites to a network infrastructure. The network infrastructure may include the PSTN and other existing telephone systems, Public Land Mobile Network (PLMN) gateways, local telephone exchanges such as regional public telephone networks (RPTN) or other local telephone service providers, domestic long distance networks, international networks, private networks and other RPTNs. It should be noted that the network infrastructure may further include other types of networks, such as a wireless network, X.25, the Internet, TCP/IP, ATM, etc. The satellite communication system thus operates to provide bi-directional voice and/or data communication between the user segment and the network infrastructure.

The ground segment of a low earth orbit satellite communication system may further include virtual gateways. Virtual gateways function under the control of system gateways which assign tasks for the virtual gateways to perform in the setup, call management, and call tear down procedures. A virtual gateway may also manage the satellite system resources that are allocated to it on a part time, as-required basis. Under the direction of a system gateway, a virtual gateway may function as a local gateway for the duration of the setup, call, and call tear down time and then may relinquish its authority and control of the system resources after these functions have been performed. While performing its assigned functions, the virtual gateway may reallocate its assigned resources one or more times, as required. Of course, it is possible that there are many calls being simultaneously handled by the virtual gateway, and indeed, in some installations it is possible that the virtual gateway is active 100% of the time.

In some cases a virtual gateway and its users may form a closed network. An example is a terrestrial wireless local loop. There may be many virtual gateways, that is, many disconnected closed-networks, distributed over the service area of a system gateway. Communication between user terminals of the system (i.e. system users) and users associated with the virtual gateway may be accomplished without utilizing the network infrastructure segment. Communication among the virtual gateways and a system gateway may be made in a manner similar to that for the communication between the system gateway and the system user terminals; that is, via the conventional feeder and service links. Communication among the distributed virtual gateways and the system user terminals may be accomplished via the service links of the satellites. In addition, other communication routes such as forward feeder to return feeder link and inter-satellite links are also possible.

Reference in this regard can be had, by example, to U.S. Pat. No. 5,884,142, issued Mar. 16, 1999, entitled "Low Earth Orbit Distributed Gateway Communications System", by Robert A. Wiedeman and Paul A. Monte. The disclosure of this issued patent is incorporated by reference in its entirety insofar as it does not conflict with the teachings of the present invention.

The signals included in a particular link are typically composite signals, grouped into channels within the allocated frequency band of the link. The channels within a link may be further grouped into a number of channel blocks.

Spread-spectrum techniques may be used for code-division multiplexing and demultiplexing channel blocks in a link within a satellite system. Orthogonal chip-coded waveforms may be used for frequency spreading the channel blocks at an appropriate intermediate frequency and then the channel blocks may be upconverted to the link frequency. As an example, in a forward feeder link (from a system gateway to a satellite), a channel block may be composed of numerous code division multiple access channels, possibly of various bandwidths, that are frequency division multiplexed together. The same allocated frequency spectrum of the forward feeder link may be reused by each spread channel block in the forward feeder link. Upon reception, the satellite may de-multiplex the spread channel blocks using code division techniques. The satellite may further generate inputs to a beam forming network of a transmitting multi-beam antenna for a forward service link (from the satellite to users). In this example, the same allocated frequency band of the forward service link may be reused by each antenna beam. As a further example, the same code-division multiplexing scheme may be used in a return feeder link from a satellite to a system gateway. The signals received from a return service link may be code-division multiplexed and the allocated frequency spectrum of the return feeder link may be reused by each spread channel block transmitted to the system gateway from the satellite. Upon receipt by the system gateway, the return feeder link may be code-division de-multiplexed and the de-multiplexed channel blocks may be utilized in a conventional manner.

The advantages of this example are that the allocated frequency bands are reused by each transmitted and received channel block. The power spectrum of each transmitted and received channel block is uniformly flat over the mid-band of the allocated frequency band resulting in better spectral and power efficiency. Also, using this scheme, the satellite requires no bulky input demultiplexing filters.

Reference in this regard can be had, by example, to U.S. patent application Ser. No. 09/504,130, filed Feb. 15, 2000, entitled "Feeder Link Code-Division Multiplexing and De-multiplexing for a Satellite Communication System", by Wing-po Yung and Paul A. Monte, now abandoned. The disclosure of this patent application is incorporated by reference in its entirety insofar as it does not conflict with the teachings of the present invention.

OBJECTS AND ADVANTAGES OF THE INVENTION

It is an object and advantage of this invention to provide new architectures and apparatus for satellite communications systems by the use of code division multiplexing and de-multiplexing in the feeder and service links among the satellite gateways, satellite transponders, virtual gateways and user terminals.

It is a further object and advantage of this invention to provide an improved satellite communications system that uses code division multiplexing to designate the origin and the destination of the channel blocks in the various links between the components of the communications system, and thus, together with the use of code-division de-multiplexing, routing the channel blocks among the feeder and service links is accomplished.

It is a further object and advantage of this invention to provide a code division multiplexing system for a link in a satellite communications system, so that each channel block is spread to have the same center frequency as the center frequency of the allocated frequency spectrum of the link, and that the same allocated frequency spectrum of the link is reused by each spread channel block transmitted between components of the system.

It is a further object and advantage of this invention to provide a uniformly flat power spectrum of each channel block over the mid-band of the allocated frequency band of the link; and a uniformly flat power spectrum of each channel block over the mid-band of the allocated frequency band of the link, resulting in a more efficient use of the power of the power amplifier and low noise amplifier in each component of the system.

SUMMARY OF THE INVENTION

The foregoing and other problems are overcome and the objects of the invention are realized by methods and apparatus in accordance with embodiments of this invention.

A method and apparatus are provided for code-division multiplexing and de-multiplexing channel blocks in the links in a communications satellite system. The method and apparatus includes spread spectrum techniques utilizing orthogonal chip coded waveforms.

A code division multiplexing system for a link between components of a satellite communications system is disclosed where, using spread spectrum techniques, channel blocks are each spread by a pre-assigned orthogonal chip-coded waveform. The pre-assigned orthogonal chip-coded waveforms are each preferably chosen according to the origin and destination of the channel block. The channel blocks are each spread over an intermediate frequency and then upconverted such that their spreading bandwidth is equal, or approximately equal, to the allocated bandwidth of the particular link through which they will be transmitted. The channel blocks are spread so they each have the same, or approximately the same, center frequency as the allocated frequency spectrum of the link.

A system for de-multiplexing the channel blocks in a link as received by one of the components of a satellite communications system is also disclosed, where the de-multiplexed link signals are then used to generate commands for use within the receiving component or to generate communications in another link.

DETAILED DESCRIPTION OF THE PREFERRED EMBODIMENTS

Figure 1:
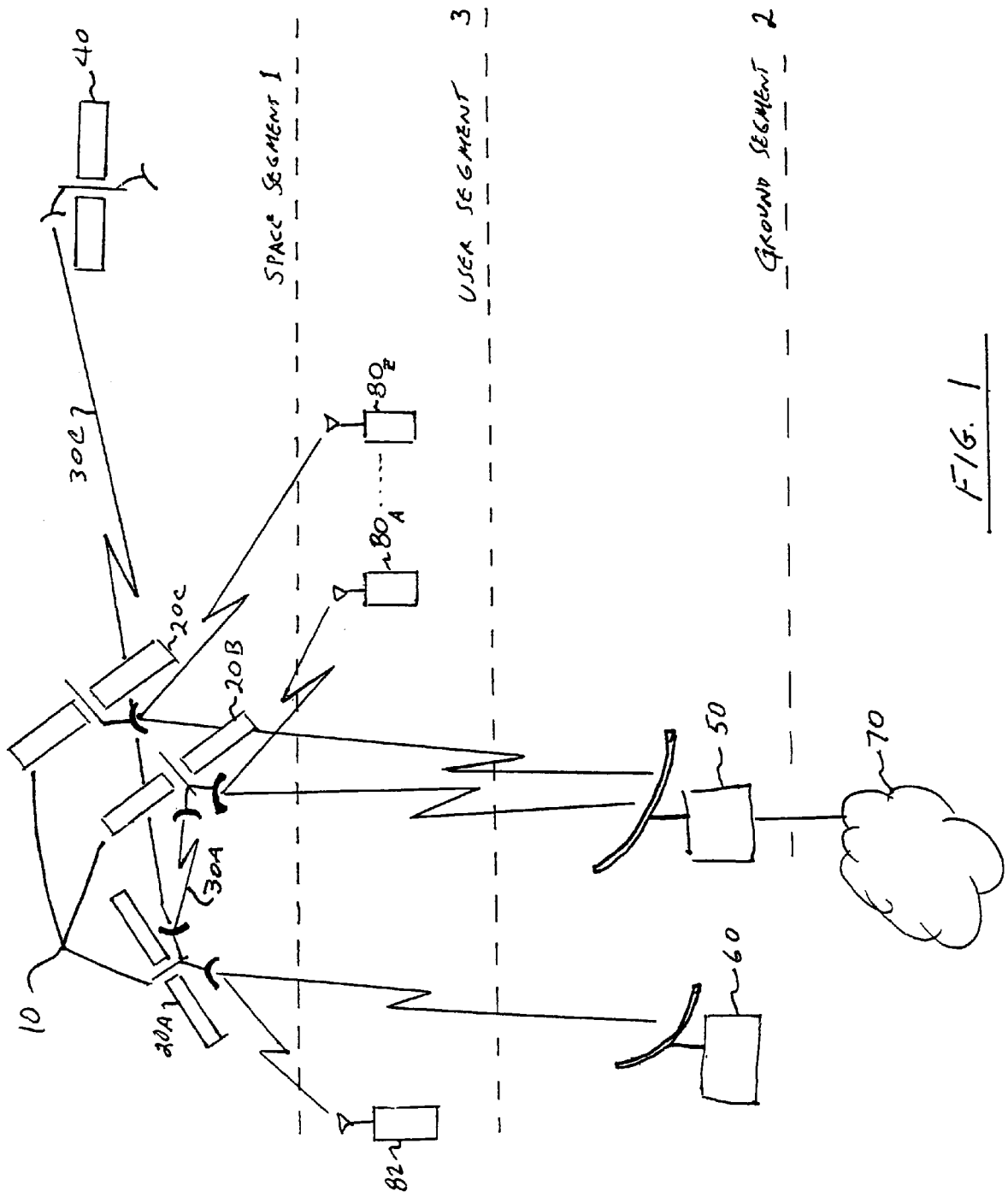
FIG. 1 is a block diagram of a satellite communications system that is constructed to, and operated in accordance with, a presently preferred embodiment of this invention.

FIG. 1 shows a satellite communication system suitable for practicing the present invention. The satellite communications system includes a space segment 1, a ground segment 2 and a user segment 3. The space segment 1 may include at least one low-orbit satellite constellation 10. The constellation may include at least two satellites 20A, 20B, and the satellites optionally may support an inter-satellite link 30A to at least one satellite 20B within the present system or an inter-satellite link 30C to at least one satellite 40 of a separate satellite system.

The ground segment may include a system gateway 50 and optionally at least one virtual gateway 60. As in the example system described above, the system gateway 50 may serve as the principal connecting points to at least one network 70, which may include an open network, for example the PSTN. Network 70 may also include packet data networks, terrestrial cellular networks or any other network suitable for conveying data or voice transmissions. Each virtual gateway 60 forms a closed star network with its own users. An example of such a virtual gateway based system would be a wireless local loop.

The user segment 3 includes user terminals $80_A, \ldots, 80_Z$ and also may include at least one user terminals 82 associated with the virtual gateway 60. The virtual gateway 60 can be viewed as a heavy traffic system user that aggregates the transmission and reception of its users.

In the satellite communication system of the present invention, signals preferably have a specific source and a specific destination. For example, the source, or origination point, of signals in a forward feeder link may be the system gateway 50, and the destination may be the satellite 20B. The source of signals in a virtual uplink may be the virtual gateway 60 and the destination may be the satellite 20A. The following table is illustrative of the types of signal links between the components of the satellite communications system.

TABLE 1

| Source | Destination | Link |
| --- | --- | --- |
| System gateway 50 | Satellite 20B | Forward feeder link |
| Satellite 20B | System gateway 50 | Return feeder link |
| Virtual gateway 60 | Satellite 20A | Virtual uplink |
| Satellite 20A | Virtual gateway 60 | Virtual downlink |
| Satellite 20A, 20B | User terminal 82, 80 | Forward service link |
| User terminal 82, 80 | Satellite 20A, 20B | Return service link |

TABLE 1-continued

| Source | Destination | Link |
| --- | --- | --- |
| Satellite 20A | Satellite 20B | Forward inter-satellite link for Satellite 20A |
| Satellite 20B | Satellite 20A | Return inter-satellite link for Satellite 20A |
| Satellite 20A | Satellite 20B | Forward inter-satellite link for Satellite 20B |
| Satellite 20B | Satellite 20A | Return inter-satellite link for Satellite 20B |

It should be noted that virtual links and service links may share the same satellite antenna and the same allocated frequency band. It should be further noted that within a link, a signal may be transmitted through at least one antenna beam at its source, and may be recognized by at least one antenna beam at its destination.

Figure 2:
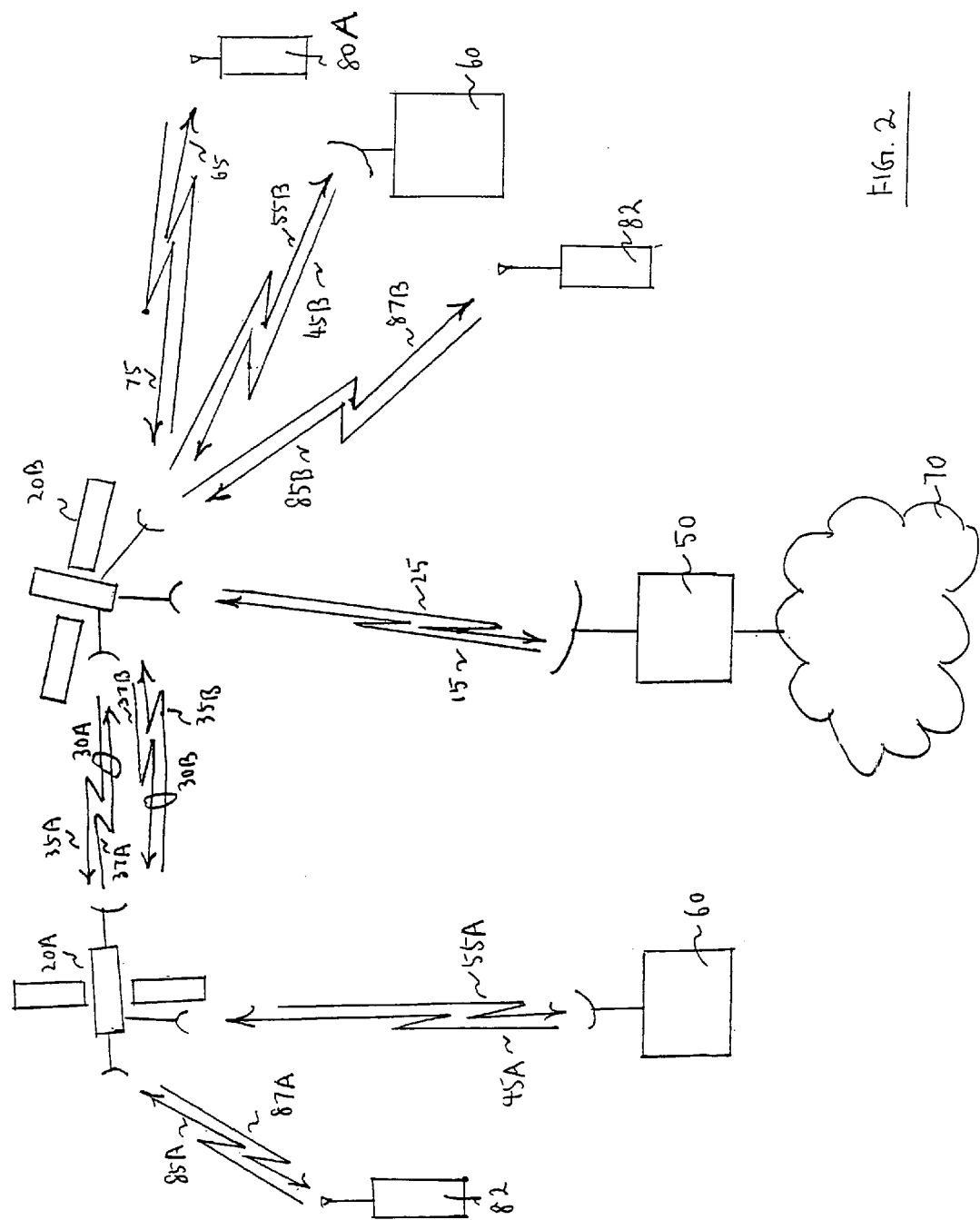
FIG. 2 depicts the various links between the components of the satellite communications system.

FIG. 2 shows the links of Table 1 for conveying signals between the components of the satellite communications system. The forward feeder link 15 conveys or transports signals from the system gateway 50 to the satellite 20B. The return feeder link 25 conveys signals in the reverse direction, from the satellite 20B to the system gateway 50. Signals are transported from the virtual gateway 60 to the satellite 20A associated with the virtual gateway 60 through the virtual uplink 45A. Signals are conveyed in the opposite direction from the satellite 20A to the virtual gateway 60 through the virtual downlink 55A. A user terminal 82 associated with the virtual gateway 60 sends and receives signals through the return service link 85A and forward service link 87A, respectively. The satellite 20B sends communications to the user terminal 80A through the forward service link 65, and the user terminal 80A sends communications back to the satellite 20B through the return service link 75. Satellite 20A and satellite 20B communication with each other through the inter-satellite link pairs 30A and 30B mentioned above. The inter-satellite link 30A includes a forward inter-satellite link 37A for conveying signals from satellite 20A to satellite 20B, and a return inter-satellite link 35A for conveying signals from satellite 20B to satellite 20A. The inter-satellite link 30B includes a forward inter-satellite link 37B for conveying signals from satellite 20B to satellite 20A, and a return inter-satellite link 35B for conveying signals from satellite 20A to satellite 20B.

As stated above, the signals included in a particular link are typically composite signals, grouped into channels within the allocated frequency band of the link. The channels within a link may be further grouped into a number of channel blocks.

The present invention uses orthogonal chip-coded spread-spectrum spreading and despreading to specify the origin, origin antenna beam, destination, and destination antenna beam identities of channel blocks within a link. This is accomplished by first determining a set of chip coded waveforms capable of producing a spreading bandwidth of about the bandwidth of the link. Subsets of the set of chip coded waveforms are then assigned for spreading and de-spreading each channel block according to the source, source antenna beam, destination, and destination antenna beam identities of the channel block. As such, the present invention is referred to herein as Spread Spectrum Code Division Destination Access (SS-CDDA). Each satellite 20A, 20B, 20C in the system may support routing channel blocks from their source to their destination, across multiple satellite links and antenna beams using this technique.

In a further embodiment, the virtual links 45A, 45B, 55A, 55B and service links 85A, 85B, 87A, 87B to user terminal 82 associated with the virtual gateway 60 may share the same satellite antenna and the same allocated frequency band. In this case the forward service link 87A, 87B and virtual down link 55A, 55B may use the same set of spreading chip-coded waveforms, and the return service link 85A, 85B and virtual up link 45A, 45B may use the same set of spreading chip-coded waveforms.

In a further embodiment, different sets of spreading chip-coded waveforms may be used for the forward service link 87A, 87B and virtual down link 55A, 55B, and different sets of spreading chip-code waveforms may be used for the return service link 85A, 85B and virtual up link 45A, 45B. It should also be noted that the satellite communication system is not limited to the set of inter-satellite links 30A, 30B mentioned above but may include multiple pairs of inter-satellite links.

In a preferred, but not limiting, embodiment there are six sets of predetermined orthogonal chip-coded waveforms: a first set for spreading over the bandwidth of the forward feeder link 15; a second set for spreading over the bandwidth of the return feeder link 25; a third set for spreading over the bandwidth of the forward service link 65, 87B; a fourth set for spreading over the bandwidth of the return service link 75, 85B; a fifth set for spreading over the bandwidth of the forward inter-satellite link 37A; and a sixth set for spreading over the bandwidth of the return inter-satellite link 35A.

Figure 3:
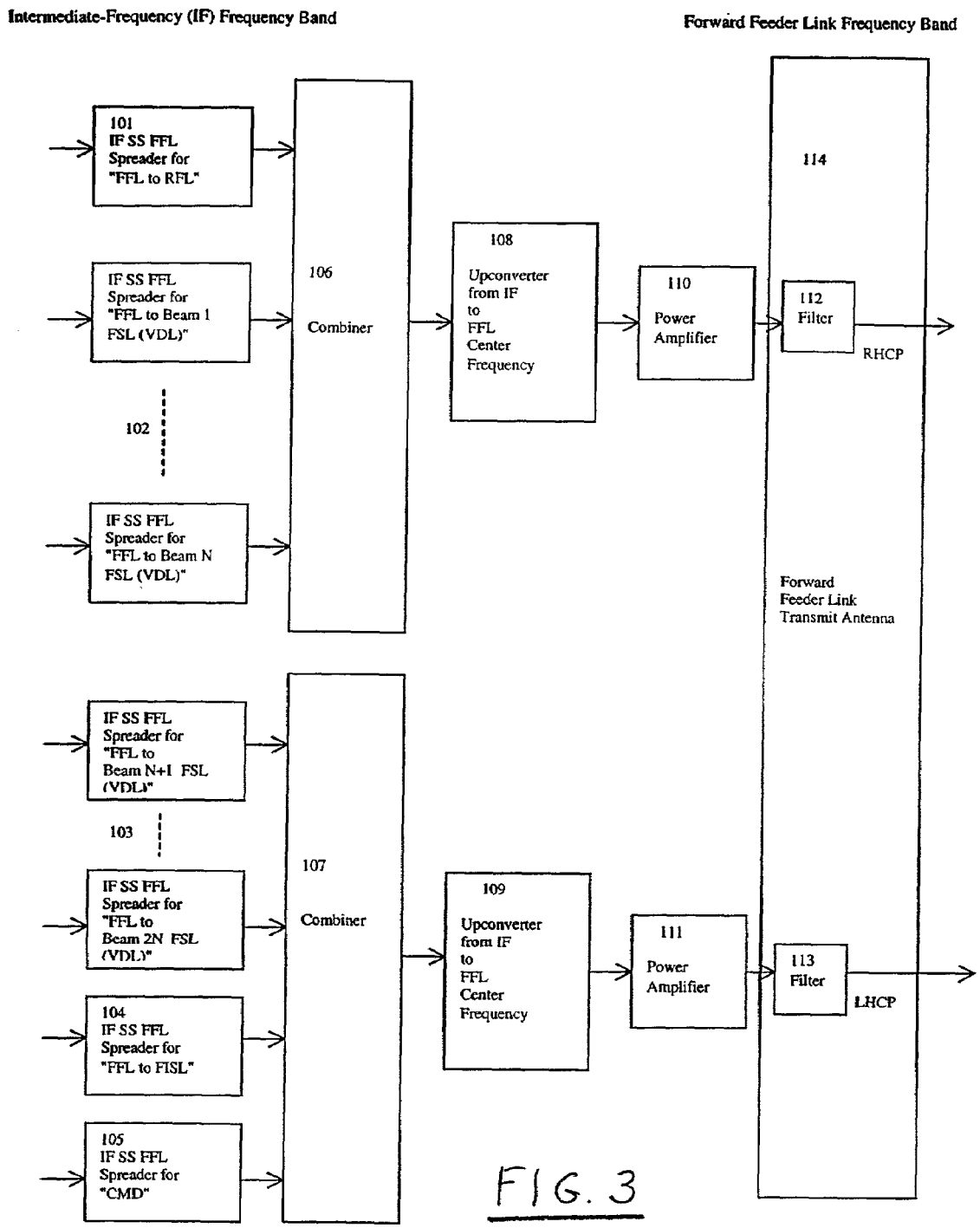
FIG. 3 is a block diagram of a system gateway structure for code division multiplexing the channel blocks to be transmitted through a forward feeder link in accordance with the teachings of this invention.

FIG. 3 shows a system gateway structure for code division multiplexing forward feeder link channel blocks using the aforementioned SS-CDDA technique. These channel blocks originate from the system gateway 50 and have destinations that may include a command receiver onboard the satellite, the return feeder link 25, and each of 2N antenna beams of the forward service link 65. In a further embodiment the channel blocks may further have destinations that include each of 2N antenna beams of a virtual down link. The destinations may further include a forward inter-satellite link 37 if inter-satellite communication is supported. The aforementioned first set of orthogonal chip coded waveforms is predetermined for code-division multiplexing the forward feeder link channel blocks at a chip rate for spreading over a bandwidth allocated for the forward feeder link 15. Subsets of the set of predetermined orthogonal chip coded waveforms are assigned for spreading the channel blocks according to their source, source antenna beam, destination, and destination antenna beam identities of the channel block. Thus, the set of pre-determined spreading waveforms indicates the source or origin of a channel block, and the subset of the pre-determined set that is assigned to a channel block indicates its destination.

In FIG. 3, spreaders 101, $102_1$ through $102_N$, $103_{N+1}$ through $103_{2N}$, 104 and 105 all spread their respective inputs at an appropriate intermediate frequency and perform spreading over the allocated bandwidth of the forward feeder link 15.

The spreader 101 spreads channel blocks having a destination of the return feeder link 25 using a first subset assigned from the set of predetermined orthogonal chip-coded waveforms for spreading over the allocated bandwidth of the forward feeder link 15.

Spreaders $102_1$ through $102_N$ are used to spread channel blocks having the destinations of 1 through N antenna beams of the forward service link 65 using a second subset of waveforms assigned from the set of predetermined chip-coded forward feeder link waveforms. In a further embodiment, spreaders $102_1$ through $102_N$ are used to spread channel blocks having the destinations of 1 through N antenna beams of the virtual downlink 55.

Spreaders $103_{N+1}$ through $103_{2N}$ are used to spread channel blocks having the destinations of N+1 through 2N antenna beams of the forward service link 65 using a third subset assigned from the set of predetermined chip-coded forward feeder link waveforms. In a further embodiment, spreaders $103_{N+1}$ through $103_{2N}$ are used to spread channel blocks having the destinations of N+1 through 2N antenna beams of the virtual downlink 55.

The spreader 104 spreads channel blocks having a destination of the forward inter-satellite link 37 using a fourth subset assigned from the set of predetermined orthogonal chip-coded forward feeder link waveforms.

The spreader 105 spreads channel blocks having a destination of the command channel of the satellite using a fifth subset assigned from the set of predetermined orthogonal chip-coded forward feeder link waveforms.

The outputs of the spreaders 101 and $102_1$ through $102_N$ are combined by the combiner 106 and the outputs of spreaders 104, 105, and $103_{N+1}$ through $103_{2N}$ are combined by the combiner 107

The code-division multiplexed blocks of the output of the combiner 106 and the combiner 107 are upconverted from their intermediate-frequencies to the center frequency of the allocated forward feeder link frequency band by upconverters 108 and 109, respectively.

The outputs of the upconverters 108 and 109 are amplified by the power amplifiers 110 and 111, respectively, and the output of power amplifiers 110 and 111 are filtered by filters 112 and 113, respectively.

The output of filter 112 is transmitted by the forward feeder link transmit antenna 114 using right-hand circular polarization (RHCP), while the output of filter 113 is transmitted by the forward feeder link transmit antenna 114 using left-hand circular polarization (LHCP).

Figure 4:
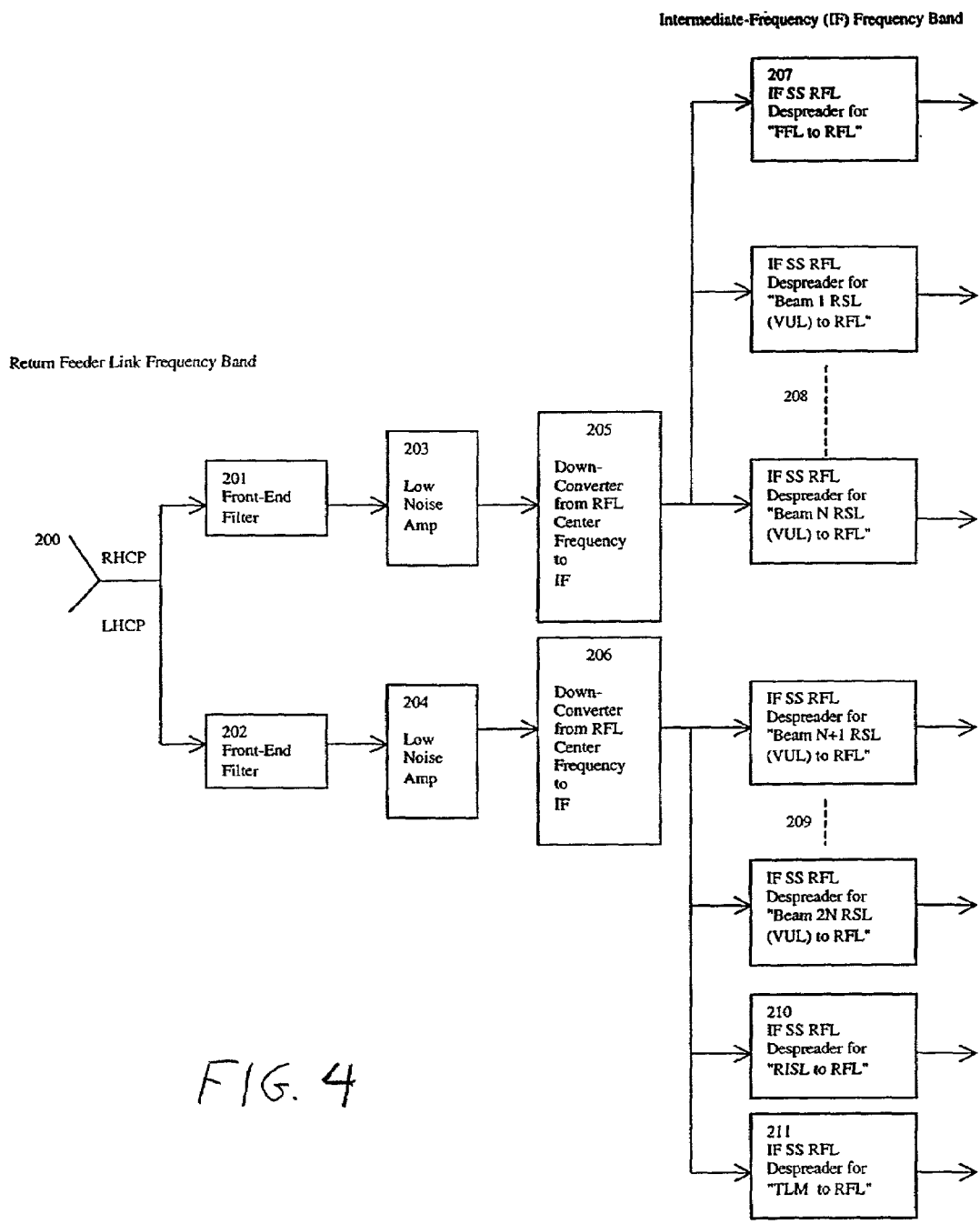
FIG. 4 is a block diagram of a system gateway structure for demultiplexing the channel blocks received through a return feeder link according to the teachings of the invention.

FIG. 4 shows a system gateway structure for code-division de-multiplexing channel blocks that have been transmitted from one of the satellites 20A, 20B, 20C and received by the system gateway 50 (FIG. 2) through the return feeder link 25. The channel blocks have been multiplexed using the spread spectrum code division destination access (SS-CDDA) technique described above and may have originated from the forward feeder link 15, from each of 2N antenna beams of the return service link 75 or virtual up link 45, from a telemetry transmitter onboard one of the satellites, or from a return inter-satellite link 35B of inter-satellite link 30B if inter-satellite communication is supported. The channel blocks have been spread using a pre-determined set of orthogonal chip-coded waveforms at a chip-rate for spreading over the allocated bandwidth of the return feeder link 25. After the channel blocks have been received by the system gateway 50, the same set of orthogonal chip-coded waveforms for spreading over the allocated bandwidth of the return feeder link 25 is used for de-multiplexing the channel blocks.

In FIG. 4, the return feeder link 25, including the code-division multiplexed blocks, is received through a dual polarization (right-hand circular and left-hand circular) antenna 200 at the allocated return feeder link frequency band.

The code-division multiplexed channel blocks are segregated according to their polarization. RHCP and LHCP channel blocks are filtered by front end filters 201 and 202, respectively, and are amplified by low noise amplifiers 203 and 204, respectively.

The outputs of the low noise amplifiers 203 and 204 are downconverted from the center frequency of the return feeder link frequency band to an intermediate-frequency by downconverters 205 and 206, respectively.

Despreaders 207, 208, through $208_N$, $209_{N+1}$ through $209_{2N}$, 210 and 211 regenerate the received channel blocks at an intermediate frequency by using the assigned subsets of the predetermined set of orthogonal chip coded waveforms used for spreading over the allocated bandwidth of the return feeder link 25.

Channel blocks originating from the forward feeder link 15 are regenerated at an intermediate-frequency by the despreader 207.

Despreaders $208_1$ through $208_N$ are used to despread channel blocks originating from of 1 through N antenna beams of the return service link 75 using the subset of waveforms assigned from the set of predetermined chip-coded return feeder link waveforms. In a further embodiment, despreaders $208_1$ through $208_N$ are used to despread channel blocks originating from 1 through N antenna beams of the virtual uplink 45.

Despreaders $209_{N+1}$ through $209_{2N}$ are used to despread channel blocks originating from N+1 through 2N antenna beams of the return service link 75 using the subset assigned from the set of predetermined chip-coded return feeder link waveforms. In a further embodiment, despreaders $209_{N+1}$ through $209_{2N}$ are used to despread channel blocks originating from N+1 through 2N antenna beams of the virtual uplink 45.

The despreader 210 despreads channel blocks originating from the return inter-satellite link 35B using its assigned subset from the set of predetermined orthogonal chip-coded return feeder link waveforms.

The despreader 211 despreads channel blocks originating from a telemetry transmitter onboard the satellite. The telemetry channel blocks are despread using the assigned subset of waveforms from the set of predetermined orthogonal chip-coded return feeder link waveforms.

After despreading, the system gateway 50 may utilize the channel blocks in a conventional manner.

Figure 5:
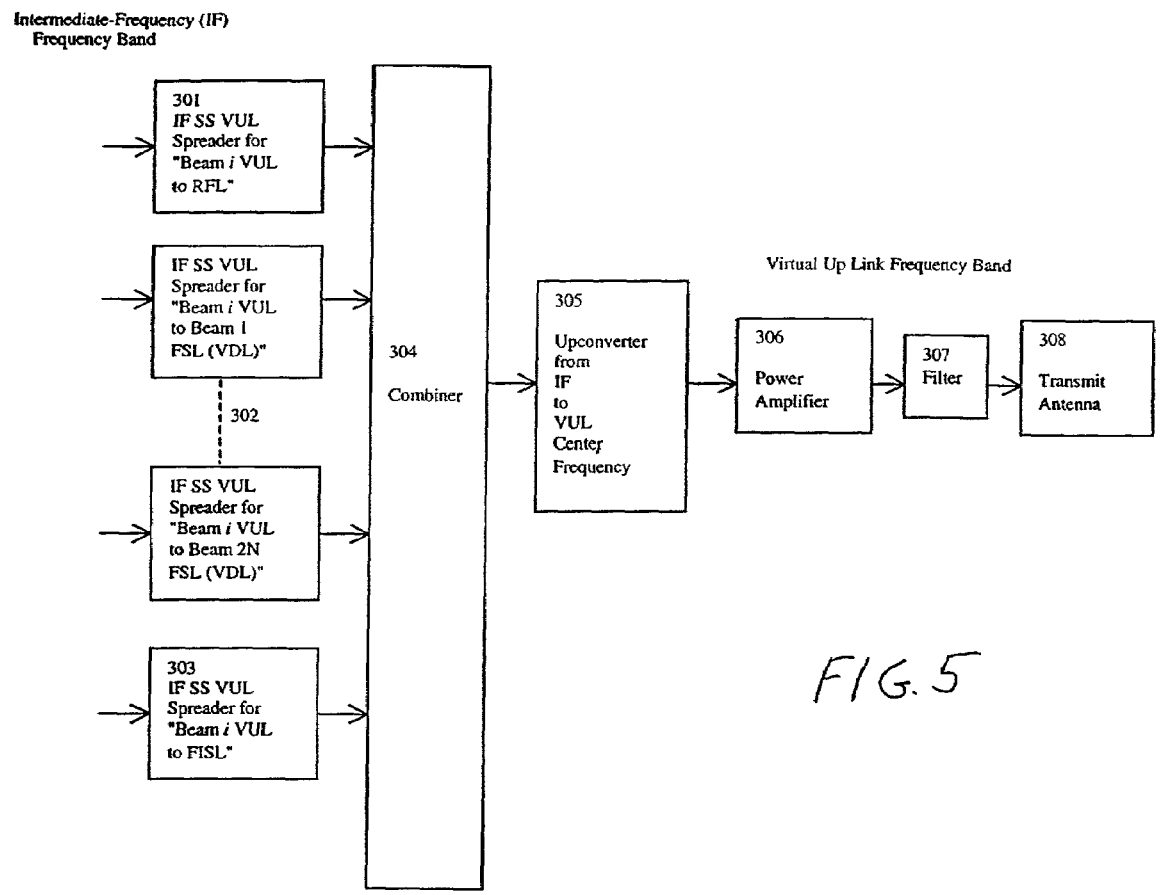
FIG. 5 is a block diagram of a virtual gateway structure for multiplexing the channel blocks of to be transmitted over a virtual up link.

Turning now to FIG. 5, a virtual gateway structure is shown for using SS-CDDA techniques to code-division multiplex channel blocks from the virtual gateway 60 to the satellite 20 through one of the 2N antenna beams of the virtual up link 45 (for example, the i-th beam, where i=1, 2, ..., 2N). These channel blocks originate from the virtual gateway 60 and have destinations that may include the return feeder link 25 and each of 2N antenna beams of the forward service link 65. In a further embodiment the channel blocks may further have destinations that include each of 2N antenna beams of the virtual down link 55. The destinations may further include the forward inter-satellite link 37 if inter-satellite communication is supported. A set of orthogonal chip coded waveforms is predetermined for code-division multiplexing the virtual uplink channel blocks at a chip rate for spreading over a bandwidth allocated for the virtual uplink 45. Subsets of the set of predetermined orthogonal chip coded waveforms are assigned for spreading the channel blocks according to their destination.

Spreaders 301, $302_1$ through $302_{2N}$, and 303 all spread their respective inputs at an appropriate intermediate frequency and perform spreading over the allocated bandwidth of the virtual uplink 45.

The spreader 301 spreads channel blocks originating from the virtual gateway within the coverage of satellite antenna beam i (where i=1, 2, ..., 2N) in the virtual uplink 45 and having a destination of the return feeder link 25. Spreader 301 uses a first subset of waveforms assigned from the set of predetermined orthogonal chip-coded waveforms for spreading over the allocated bandwidth of the virtual uplink 45.

Spreaders $302_1$ through $302_{2N}$ are used to spread channel blocks having the destinations of 1 through 2N antenna beams of the forward service link 65 using a second subset of waveforms assigned from the set of predetermined chip-coded virtual uplink waveforms. In a further embodiment, spreaders $302_1$ through $302_{2N}$ are used to spread channel blocks having the destinations of 1 through N antenna beams of the virtual downlink 55.

The spreader 303 spreads channel blocks originating from the virtual gateway within the coverage of satellite antenna beam i (where i=1, 2, ..., 2N) in the virtual uplink 45 and having a destination of the forward inter-satellite link 37. Spreader 303 uses a third set of waveforms assigned from the set of predetermined orthogonal chip-coded waveforms for spreading over the allocated bandwidth of the virtual uplink 45.

The outputs of the spreaders 301, $302_1$ through $302_{2N}$, and 303 are combined by the combiner 304. The code-division multiplexed blocks of the output of the combiner 304 are upconverted from their intermediate-frequencies to the center frequency of the allocated virtual uplink frequency band by upconverter 305. The output of the upconverter 305 is amplified by the power amplifier 306. After amplification, the output of the power amplifier 306 is filtered by filter 307 and transmitted by the virtual uplink transmit antenna 308.

Figure 6:
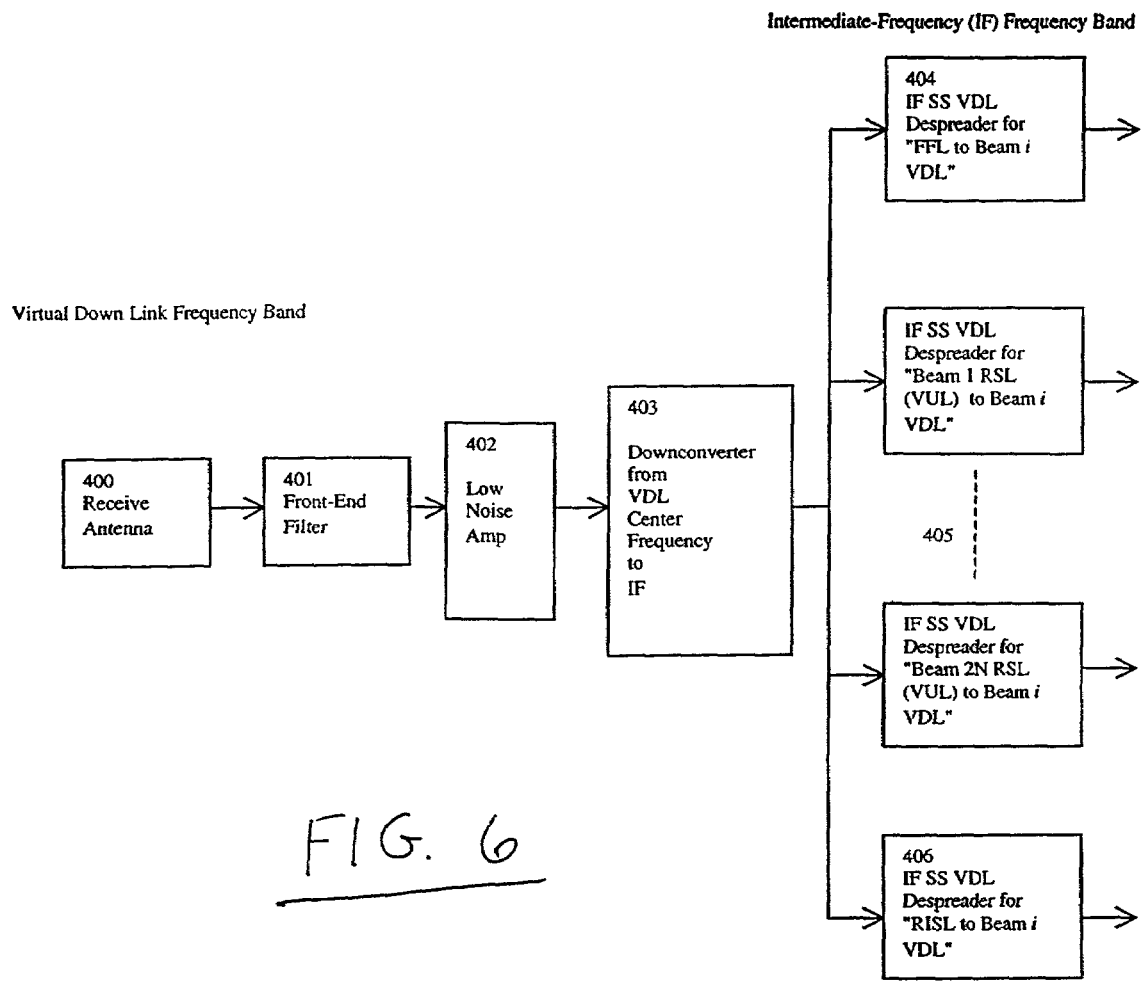
FIG. 6 is a block diagram of a virtual gateway structure for demultiplexing the channel blocks received from a virtual down link.

FIG. 6 shows a virtual gateway structure for code-division de-multiplexing channel blocks that have been transmitted from one of the satellites 20A, 20B, 20C and received by the virtual gateway 60 (FIG. 1). The channel blocks are received through one of the 2N antenna beams (for example, the i-th beam, where i=1, 2, ..., 2N) of the virtual downlink 55. The channel blocks have been multiplexed using the spread spectrum code division destination access (SS-CDDA) technique described above and may have originated from each of 2N antenna beams of the return service link 75 or virtual up link 45, or from a return inter-satellite link 35 if inter-satellite communication is supported. The channel blocks have been spread using a pre-determined set of orthogonal chip-coded waveforms at a chip-rate for spreading over the allocated bandwidth of the virtual downlink 55. After the channel blocks have been received by the virtual gateway 60, the same set of orthogonal chip-coded waveforms for spreading over the allocated bandwidth of the virtual downlink 55 is used for de-multiplexing the channel blocks.

In FIG. 6, the virtual downlink 55, including the code-division multiplexed blocks, is received through antenna 400 at the allocated virtual downlink frequency band.

The received code-division multiplexed blocks are filtered by the front-end filter 401 and amplified by the low noise amplifier 402. The output of low noise amplifier 402 is downconverted from the center frequency of the virtual down link frequency band to an intermediate frequency by downconverter 403.

Despreaders 404, $405_1$ through $405_{2N}$, and 406 regenerate the received channel blocks at an intermediate frequency by using the assigned subsets of the predetermined set of orthogonal chip coded waveforms used for spreading over the allocated bandwidth of the virtual downlink 55.

Channel blocks originating from the forward feeder link 15 are regenerated at an intermediate-frequency by the despreader 404.

Despreaders $405_1$ through $405_{2N}$ are used to despread channel blocks originating from of 1 through 2N antenna beams of the return service link 75 using the subset of waveforms assigned from the set of predetermined chip-coded virtual downlink waveforms. In a further embodiment, despreaders $405_1$ through $405_{2N}$ are used to despread channel blocks originating from 1 through N antenna beams of the virtual uplink 45.

The despreader 406 despreads channel blocks originating from the return inter-satellite link 35 using the subset of waveforms assigned from the set of predetermined orthogonal chip-coded virtual downlink waveforms.

After despreading, the virtual gateway 60 utilizes the channel blocks in a conventional manner.

Figure 7:
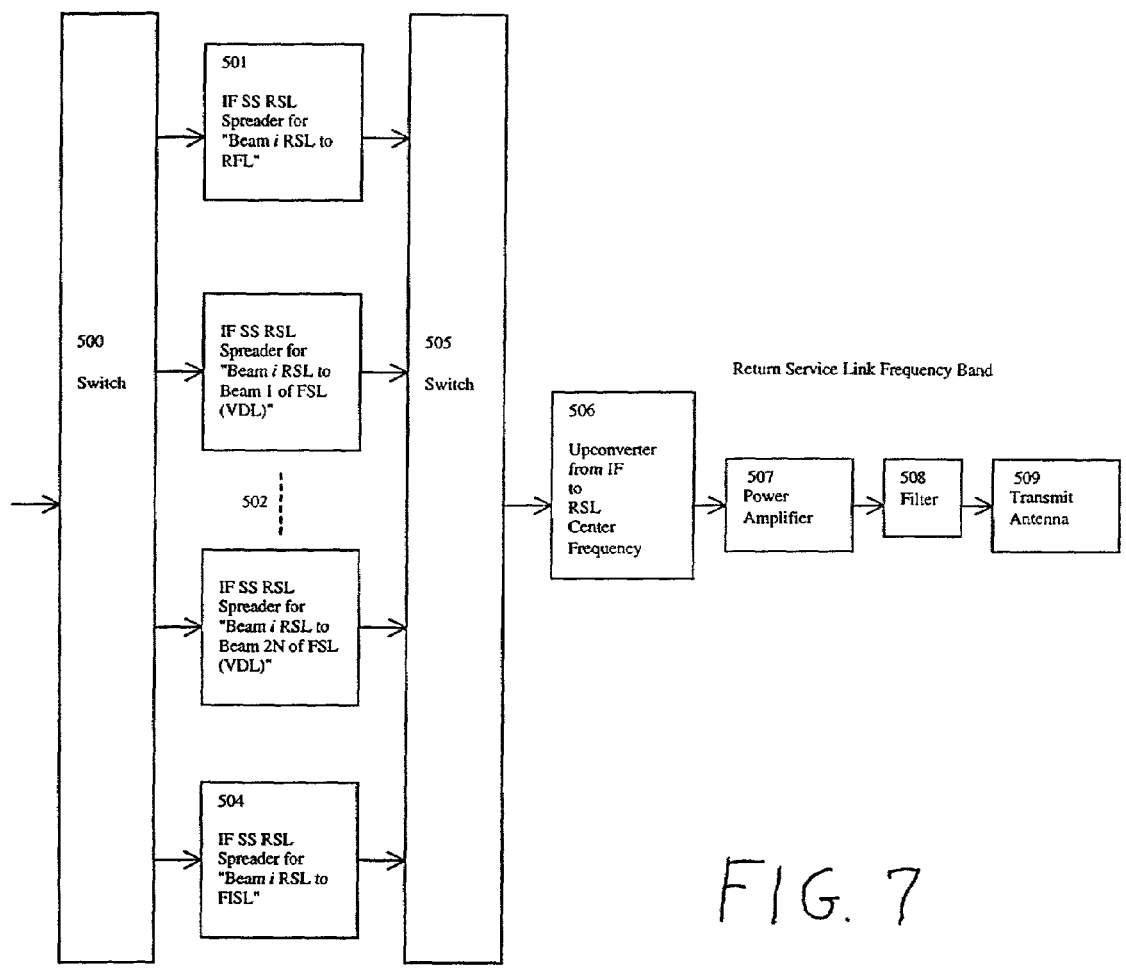
FIG. 7 is a block diagram of a user terminal transmitter structure for multiplexing the channel blocks to be transmitted over a return service link.

Turning now to FIG. 7, a system user terminal structure is shown for using SS-CDDA techniques to code-division multiplex channel blocks from the user terminal 80 to the satellite 20B through one of the 2N antenna beams of the return service link 75 (for example, the i-th beam, where i=1, 2, . . . , 2N). These channel blocks originate from the user terminal 80A and have destinations that may include the return feeder link 25 and each of 2N antenna beams of the forward service link 65. In a further embodiment the channel blocks may further have destinations that include each of 2N antenna beams of a virtual down link. The destinations may further include a forward inter-satellite link 37B if inter-satellite communication is supported. A set of orthogonal chip coded waveforms is predetermined for code-division multiplexing the return service link channel blocks at a chip rate for spreading over a bandwidth allocated for the return service link 75. Individual subsets of the set of predetermined orthogonal chip coded waveforms are assigned for spreading the channel blocks according to their destination.

In FIG. 7, spreaders 501, $502_1$ through $502_{2N}$, and 504 all spread their respective inputs at an appropriate intermediate frequency and perform spreading over the allocated bandwidth of the return service link 75.

Switch 500 switches signals generated by the user terminal 80 to the appropriate spreader and functions in a manner similar to a multiplexer. The spreader 501 spreads channel blocks originating from the user terminal within the coverage of satellite antenna beam i (where i=1, 2, . . . , 2N) in the return service link 75 and having a destination of the return feeder link 25. Spreader 501 uses a first subset of waveforms assigned from the set of predetermined orthogonal chip-coded waveforms for spreading over the allocated bandwidth of the return service link 75.

Spreaders $502_1$ through $502_N$ are used to spread channel blocks having the destinations of 1 through 2N antenna beams of the forward service link 65 using a second subset of waveforms assigned from the set of predetermined chip-coded return service link waveforms. In a further embodiment, spreaders $502_1$ through $502_{2N}$ are used to spread channel blocks having the destinations of 1 through 2N antenna beams of the virtual down link.

The spreader 504 spreads channel blocks originating from the user terminal within the coverage of satellite antenna beam i (where i=1, 2, . . . , 2N) in the return service link 75 and having a destination of the forward inter-satellite link 37B. Spreader 504 uses a third set of waveforms assigned from the set of predetermined orthogonal chip-coded waveforms for spreading over the allocated bandwidth of the return service link 75.

After spreading the switch 505 switches the code division multiplexed channel blocks to the upconverter 506, and functions in a manner similar to a de-multiplexer.

The code-division multiplexed blocks of the output of the switch 505 are upconverted from their intermediate-frequencies to the center frequency of the allocated return service link frequency band by upconverter 506. The output of the upconverter 506 is amplified by the power amplifier 507. After amplification, the output of the power amplifier 507 is filtered by filter 508 and transmitted by the transmit antenna 509 of the system user terminal 80.

Figure 8:
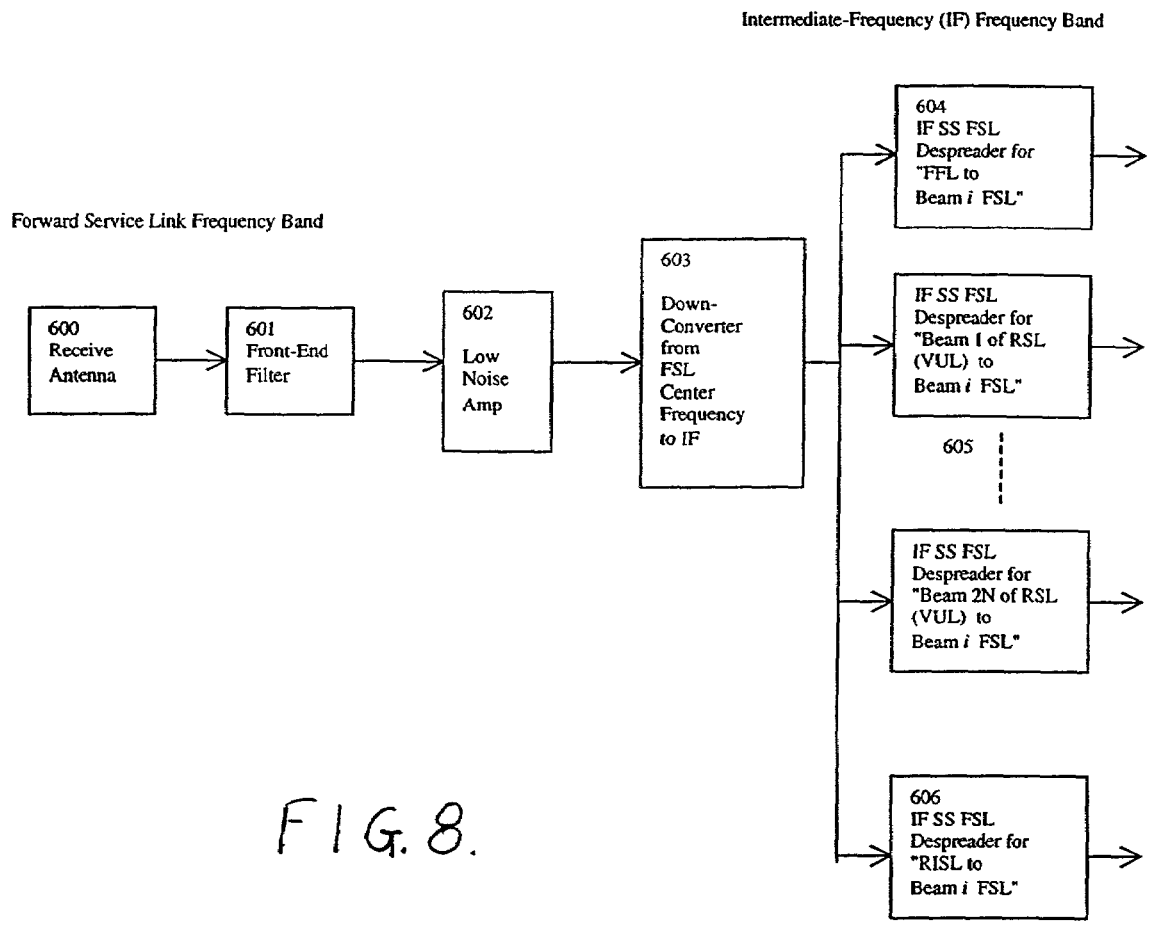
FIG. 8 is a block diagram of a user terminal receiver structure for demultiplexing the channel blocks received over a forward service link.

FIG. 8 shows a user terminal structure for code-division de-multiplexing channel blocks that have been transmitted from the satellite 20B and received by the user terminal 80 (FIG. 2). The channel blocks are received through one of the 2N antenna beams (for example, the i-th beam, where i=1, 2, . . . , 2N) of the forward service link 65. The channel blocks have been multiplexed using the spread spectrum code division destination access (SS-CDDA) technique described above and may have originated from the forward feeder link 15, each of 2N antenna beams of the return service link 75 or virtual up link 45, or from the return inter-satellite link 35B if inter-satellite communication is supported. The channel blocks have been spread using a pre-determined set of orthogonal chip-coded waveforms at a chip-rate for spreading over the allocated bandwidth of the forward service link 65. After the channel blocks have been received by the user terminal 80, the same set of orthogonal chip-coded waveforms for spreading over the allocated bandwidth of the forward service link 65 is used for de-multiplexing the channel blocks.

In FIG. 8, the forward service link 65, including the code-division multiplexed blocks, is received through antenna 600 at the allocated forward service link frequency band.

The received code-division multiplexed blocks are filtered by the front-end filter 601 and amplified by the low noise amplifier 602. The output of low noise amplifier 602 is downconverted from the center frequency of the forward service link frequency band to an intermediate frequency by downconverter 603.

Despreaders 604, $605_1$ through $605_{2N}$, and 606 regenerate the received channel blocks at an intermediate frequency by using the assigned subset of the predetermined set of orthogonal chip coded waveforms used for spreading over the allocated bandwidth of the forward service link 65.

Channel blocks originating from the forward feeder link 15 are regenerated at an intermediate-frequency by the despreader 604.

Despreaders $605_1$ through $605_{2N}$ are used to despread channel blocks originating from of 1 through 2N antenna beams of the return service link 75 using the subset of waveforms assigned from the set of predetermined chip-coded forward service link waveforms. In a further embodiment, despreaders $605_1$ through $605_{2N}$ are used to despread channel blocks originating from 1 through N antenna beams of the virtual uplink 45.

The despreader 606 despreads channel blocks originating from the return inter-satellite link 35B using the subset of waveforms assigned from the set of predetermined orthogonal chip-coded forward service link waveforms.

After despreading, the user terminal 80 utilizes the channel blocks in a conventional manner.

Figure 9:
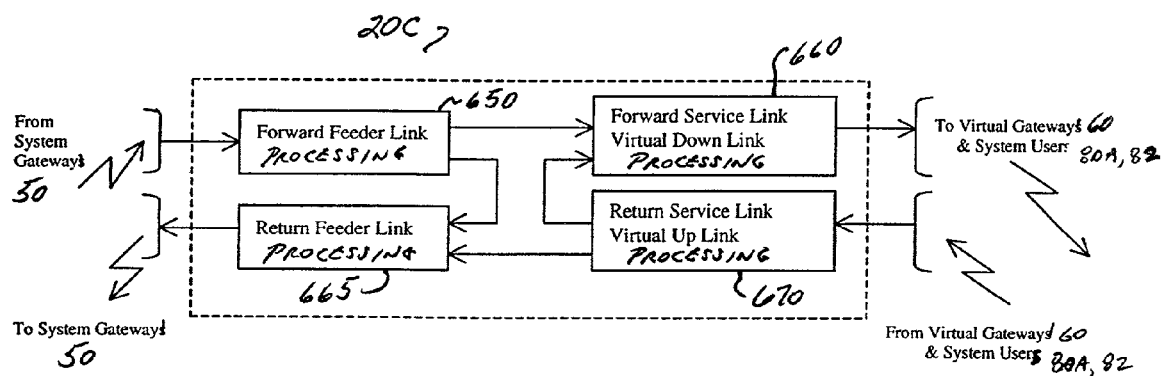
FIG. 9 shows the links to and from a satellite transponder that does not support inter-satellite links.

FIG. 9 is presented to convey an overall understanding of the processing functions of the present invention, as performed by a satellite that does not support inter-satellite links. Signals received from the system gateway 50 are processed by the forward feeder link processing circuitry 650 and are routed either to the forward service link/virtual downlink processing circuitry 660 or to the return feeder link processing circuitry 665. Signals received from the virtual gateway 60 and/or from the user terminals 80A, 82 are processed by the return service link/virtual uplink processing circuitry 670 and routed either to the forward service link/virtual downlink processing circuitry 660 or to the return feeder link processing circuitry 665.

From the forward service link/virtual downlink processing circuitry 660 the signals are transmitted to the virtual gateway 60, the user terminal 82 associated with the virtual gateway, and/or the user terminal 80A. From the return feeder link processing circuitry 665, the signals are transmitted to the system gateway 50.

Figure 10:
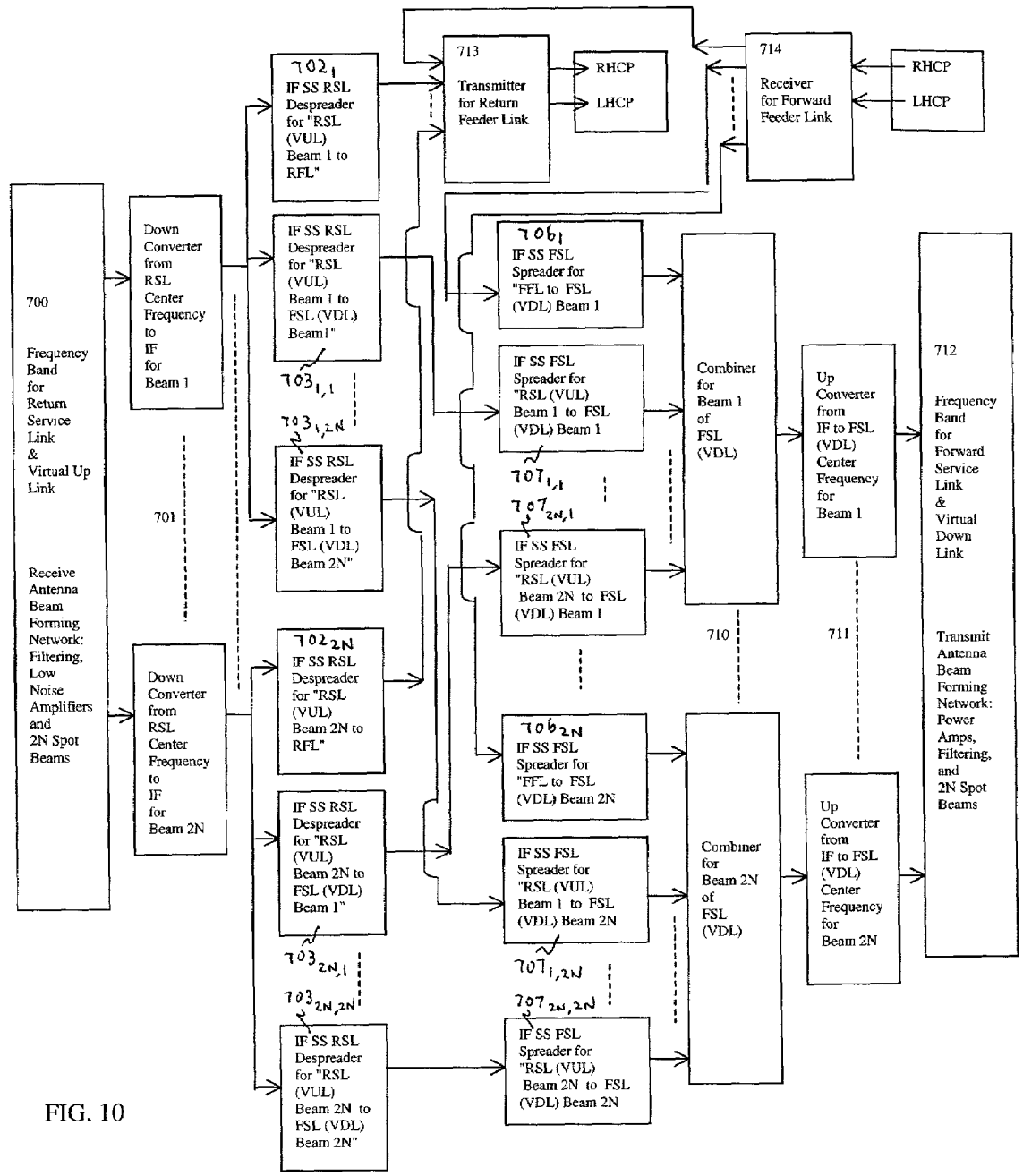
FIG. 10 is a block diagram of a structure of a satellite transponder without an inter-satellite link for code-division demultiplexing channel blocks received from the return service link and virtual up link, as well as a structure for multiplexing channel blocks from the return service link and virtual up link with those from the forward feeder link.

FIG. 10 shows a more detailed block diagram of the processing circuitry of FIG. 9 in accordance with the teachings of the present invention. FIG. 10 depicts a structure of the satellite transponder for code-division de-multiplexing channel blocks that have been received from each of the 2N antenna beams of the return service link 75 or the virtual up link 45, and the forward feeder link 15 that all have destination to the same antenna beam of the forward service link 65 and virtual down link 55.

The return service link 75 and the virtual uplink 45, including the code division multiplexed blocks, are received through 2N beam antenna 700. The 2N signals are filtered and amplified and the filtered and amplified signals are each downconverted from the center frequency of the return service link 75 or the virtual uplink 45, depending on the signal's origin, to an intermediate-frequency by downconverters $701_1, \ldots, 701_{2N}$.

For i=1, 2, ..., 2N, despreaders $702_i$, $703_{ij}$ (for j=1, 2, ..., 2N) regenerate the received channel blocks at an intermediate frequency from the downconverter $701_i$ by using the assigned subsets of the predetermined set of orthogonal chip coded waveforms used for spreading over the allocated bandwidth of the return service link 75. In a further embodiment, for the signals that have originated from the virtual uplink 45, for i=1, 2, ..., 2N, despreaders $702_i$, $703_{ij}$ (for j=1, 2, ..., 2N) regenerate the received channel blocks at an intermediate frequency from the downconverter $701_i$ by using the assigned subsets of the predetermined set of orthogonal chip coded waveforms used for spreading over the allocated bandwidth of the virtual uplink 45.

Despreaders $701_1, \ldots, 701_{2N}$ are used to despread the signal originating from beam 1, ..., beam 2N of the return service link 75, having a destination of the return feeder link 25.

The output of despreaders $701_1, \ldots, 701_{2N}$ are fed into the transmitter 713 for the return feeder link 25.

For i=1, 2, ..., 2N, despreaders $702_i$, $703_{ij}$ (for j=1, 2, ..., 2N) despread signals received from beam i of the return service link 75 with destinations of beam j (for j=1, 2, ..., 2N) of the forward service link 65, respectively.

For i=1, 2, ..., 2N and j=1, 2, ..., 2N, the output of despreader $703_{ij}$ is then respread by spreader $707_{ij}$.

Figure 11:
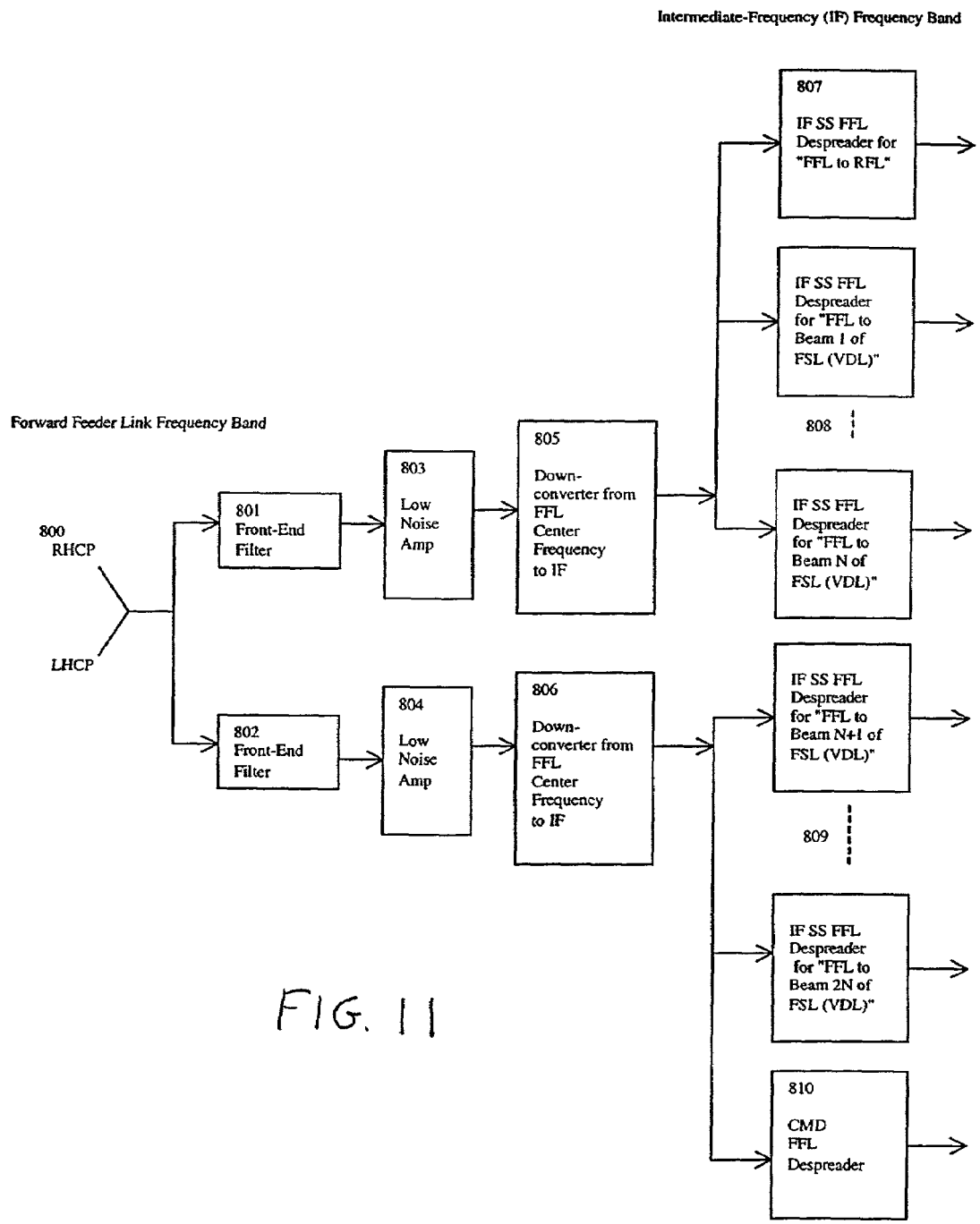
FIG. 11 is a block diagram of receiver 714 of the satellite transponder structure depicted in FIG. 10 for demultiplexing channel blocks received from the forward feeder link.

As shown in greater detail in FIG. 11, the forward feeder link receiver 714 receives 2N despread channel blocks originating from the forward feeder link 15 having destinations of each of the 2N antenna beams of the forward service link 65 or the virtual downlink 55. The 2N despread channel blocks are respread where spreaders $706_1$ through $706_{2N}$ respread signals destined for beam 1 through beam 2N of the forward service link 65 or the virtual downlink 55. The signals are respread over the frequency bandwidth of the forward service link 65 or the virtual downlink 55 depending on their destination.

For i=1, 2, ..., 2N, the outputs of the bank of spreaders $706_i$, $707_{ij}$ (for j=1, 2, ..., 2N) are combined by combiner $710_i$. Each corresponding output of the combiners $710_1$ through $710_{2N}$ is upconverted by the corresponding upconverter of the bank of upconverters $711_1$ through $711_{2N}$ from an intermediate-frequency to the center frequency of the forward service link 65 or virtual down link 55.

The outputs of upconverters $711_1$ through $711_{2N}$ are fed to a beam forming network, power amplifiers and filters of the transmit antenna 712 to generate the 2N spot beams for transmission in the forward service link 65 or the virtual down link 55.

FIG. 11 shows the detail of the receiver 714 in FIG. 10. The receiver provides the satellite receiver structure for code-division de-multiplexing the forward feeder link 15.

The forward feeder link 15, including the code-division multiplexed blocks, is received through a dual polarization (right-hand circular and left-hand circular) antenna 800 at the allocated forward feeder link frequency band.

The code-division multiplexed channel blocks are segregated according to their polarization. RHCP and LHCP channel blocks are filtered by front end filters 801 and 802, respectively, and are amplified by low noise amplifiers 803 and 804, respectively.

The outputs of the low noise amplifiers 803 and 804 are downconverted from the center frequency of the forward feeder link frequency band to an intermediate-frequency by downconverters 805 and 806, respectively.

Despreaders 807, $808_1$ through $808_N$, $809_{N+1}$ through $809_{2N}$, and 810 regenerate the received channel blocks at an intermediate frequency by using the assigned subsets of the predetermined set of orthogonal chip coded waveforms used for spreading over the allocated bandwidth of the forward feeder link 15.

Despreader 807 despreads signals originating in the forward feeder link 15 with a destination of the return feeder link 25. The forward feeder link signals are despread using the subset of waveforms assigned from the set of predetermined chip coded waveforms mentioned above.

Despreaders $808_1$ through $808_N$ are used to despread channel blocks originating from the forward feeder link 15 and having destinations including antenna beams 1 through N of the forward service link 65. The signals are despread using the subset of waveforms assigned from the set of predetermined chip-coded forward feeder link waveforms. In a further embodiment, despreaders $808_1$ through $808_N$ are used to despread channel blocks having destinations including 1 through N antenna beams of the virtual downlink 55.

Despreaders $809_{N+1}$ through $809_{2N}$ are used to despread channel blocks originating from the forward feeder link 15 and having destinations including N+1 through 2N antenna beams of the forward service link 65. The signals are despread using the subset assigned from the set of predetermined chip-coded forward feeder link waveforms. In a further embodiment, despreaders $809_{N+1}$ through $809_{2N}$ are used to despread channel blocks originating from the forward feeder link 15 and having destinations including N+1 through 2N antenna beams of the virtual downlink 55.

The despreader 810 despreads command channel blocks originating from the forward feeder link 15 using its assigned subset from the set of predetermined orthogonal chip-coded forward feeder link waveforms.

Figure 12:
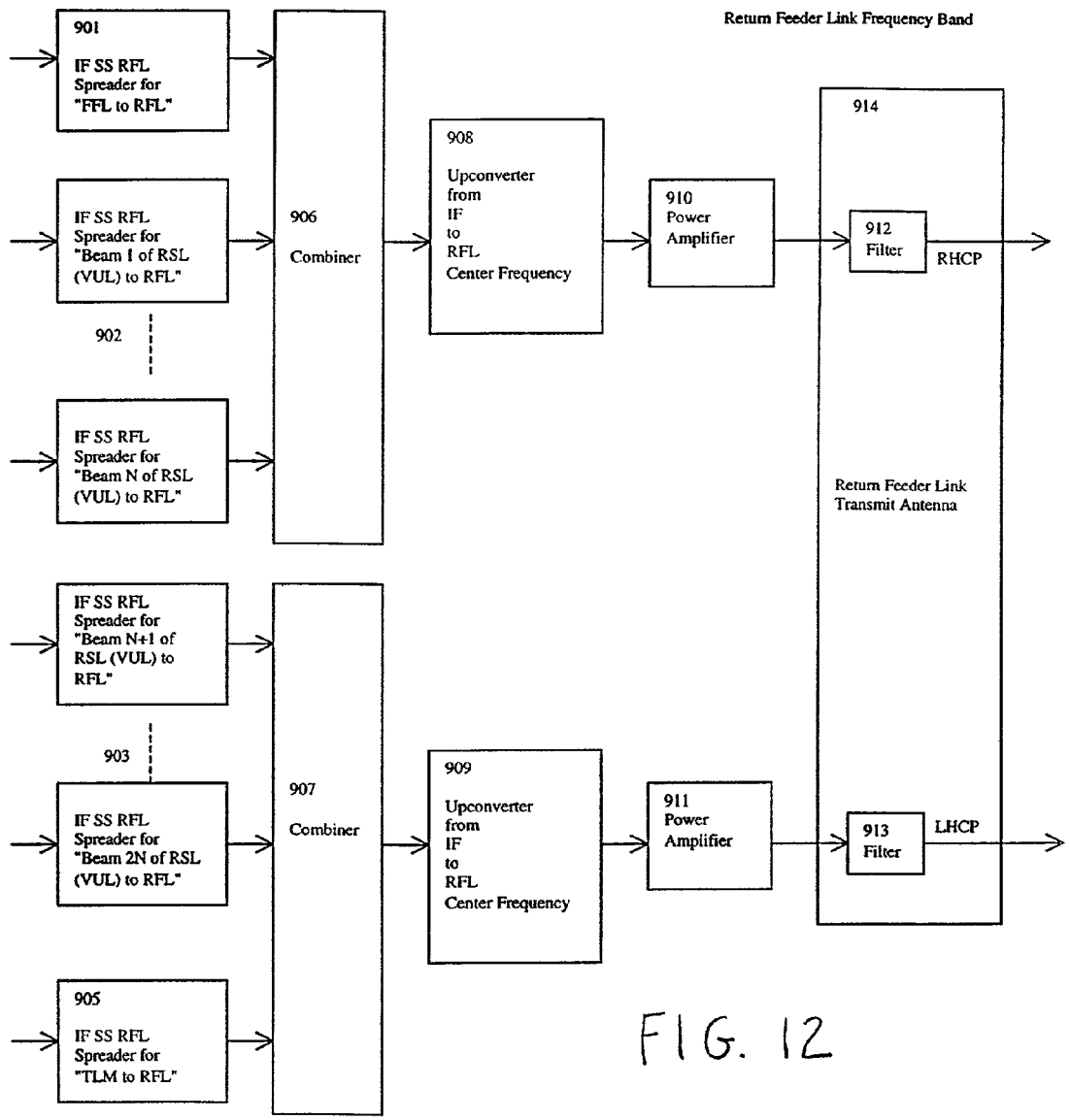
FIG. 12 is a block diagram of transmitter 713 of the satellite transponder structure as shown in FIG. 10 for multiplexing the channel blocks to be transmitted through the return feeder link.

FIG. 12 shows the satellite transmitter 713 (FIG. 10) for the return feeder link 25 in greater detail. The transmitter 713 includes structure for code-division multiplexing the regenerated channel blocks originating from the forward feeder link 15 and the return service link 75 and having a destination of the return feeder link 25. In a further embodiment the transmitter 713 includes structure for code-division multiplexing the regenerated channel blocks originating from the 2N antenna beams of the virtual up link 45.

In FIG. 12, spreaders 901, $902_1$ through $902_N$, $903_{N+1}$ through $903_{2N}$, and 905 all spread their respective inputs at an appropriate intermediate frequency and perform spreading over the allocated bandwidth of the return feeder link 25.

The spreader 901 is used to spread channel blocks received from the receiver for the forward feeder link 714 and t having a destination of the return feeder link 25. The channel blocks are spread using a first subset assigned from the set of predetermined orthogonal chip-coded waveforms for spreading over the allocated bandwidth of the return feeder link 25.

Spreaders $902_1$ through $902_N$ are used to spread channel blocks originating from 1 through N antenna beams of the return service link 75 and having a destination of the return feeder link 25. The channel blocks are spread using a second subset of waveforms assigned from the set of predetermined chip-coded return feeder link waveforms. In a further embodiment, spreaders $902_1$ through $902_N$ are used to spread channel blocks origination from 1 through N antenna beams of the virtual uplink 45.

Spreaders $903_{N+1}$ through $903_{2N}$ are used to spread channel blocks originating from N+1 through 2N antenna beams of the return service link 75, and having a destination of the return feeder links 21. The channel blocks are spread using a third subset assigned from the set of predetermined chip-coded return feeder link waveforms. In a further embodiment, spreaders $903_{N+1}$ through $903_{2N}$ are used to spread channel blocks having the destinations of N+1 through 2N antenna beams of the virtual uplink 45.

The spreader 905 spreads channel blocks originating from the telemetry channel (TLM) using a fifth subset assigned from the set of predetermined orthogonal chip-coded return feeder link waveforms.

The outputs of the spreaders 901 and $902_1$ through $902_N$ are combined by the combiner 906 and the outputs of spreaders $903_{N+1}$ through $903_{2N}$ and 905 are combined by the combiner 907

The code-division multiplexed blocks of the output of the combiner 906 and the combiner 907 are upconverted from their intermediate-frequencies to the center frequency of the allocated forward feeder link frequency band by upconverters 908 and 909, respectively.

The outputs of the upconverters 908 and 909 are amplified by the power amplifiers 910 and 911, respectively, and the output of power amplifiers 910 and 911 are filtered by filters 912 and 913, respectively.

The output of filter 912 is transmitted by the return feeder link transmit antenna 914 using right-hand circular polarization (RHCP), while the output of filter 913 is transmitted by the return feeder link transmit antenna 914 using left-hand circular polarization (LHCP).

Figure 13:
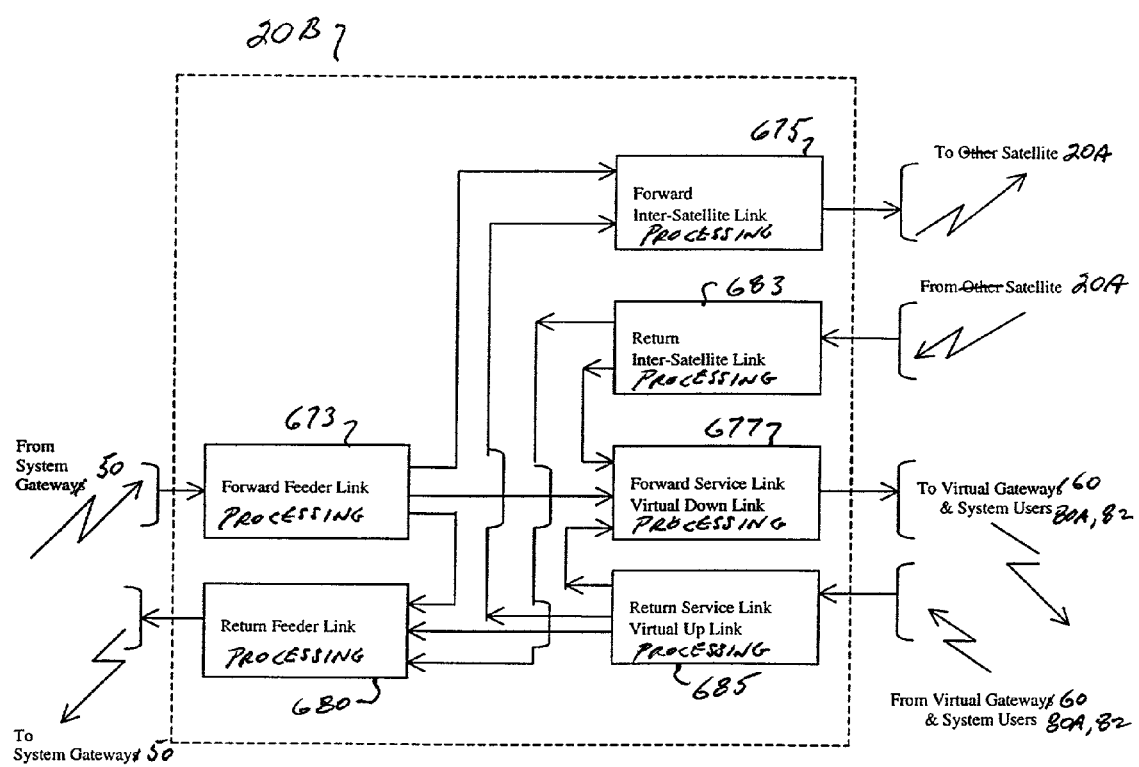
FIG. 13 shows the links to and from a satellite transponder that supports inter-satellite links.

FIG. 13 is presented to convey an overall understanding of the processing functions of the present invention, as performed by a satellite that supports inter-satellite links, for example satellite 20B (FIG. 1). Signals received from the system gateway 50 are processed by the forward feeder link processing circuitry 673 and are routed either to the forward inter-satellite processing circuitry 675, the forward service link/virtual downlink processing circuitry 677 or to the return feeder link processing circuitry 680. Signals received from the satellite 20A are processed by the return inter-satellite link processing circuitry 683 and routed to the return feeder link processing circuitry 680 or to the forward service link/virtual downlink processing circuitry 677. Signals received from the virtual gateway 60 and/or from the user terminals 80, 82 are processed by the return service link/virtual uplink processing circuitry 685 and routed to the forward inter-satellite processing circuitry 675, the forward service link/virtual downlink processing circuitry 677, or to the return feeder link processing circuitry 680.

From the forward inter-satellite processing circuitry 675 the signals are transmitted to the satellite 20A. From the forward service link/virtual downlink processing circuitry 677 the signals are transmitted to the virtual gateway 60, the user terminal 82 associated with the virtual gateway 60, and/or the user terminal 80. From the return feeder link processing circuitry 680, the signals are transmitted to the system gateway 50.

Figure 14:
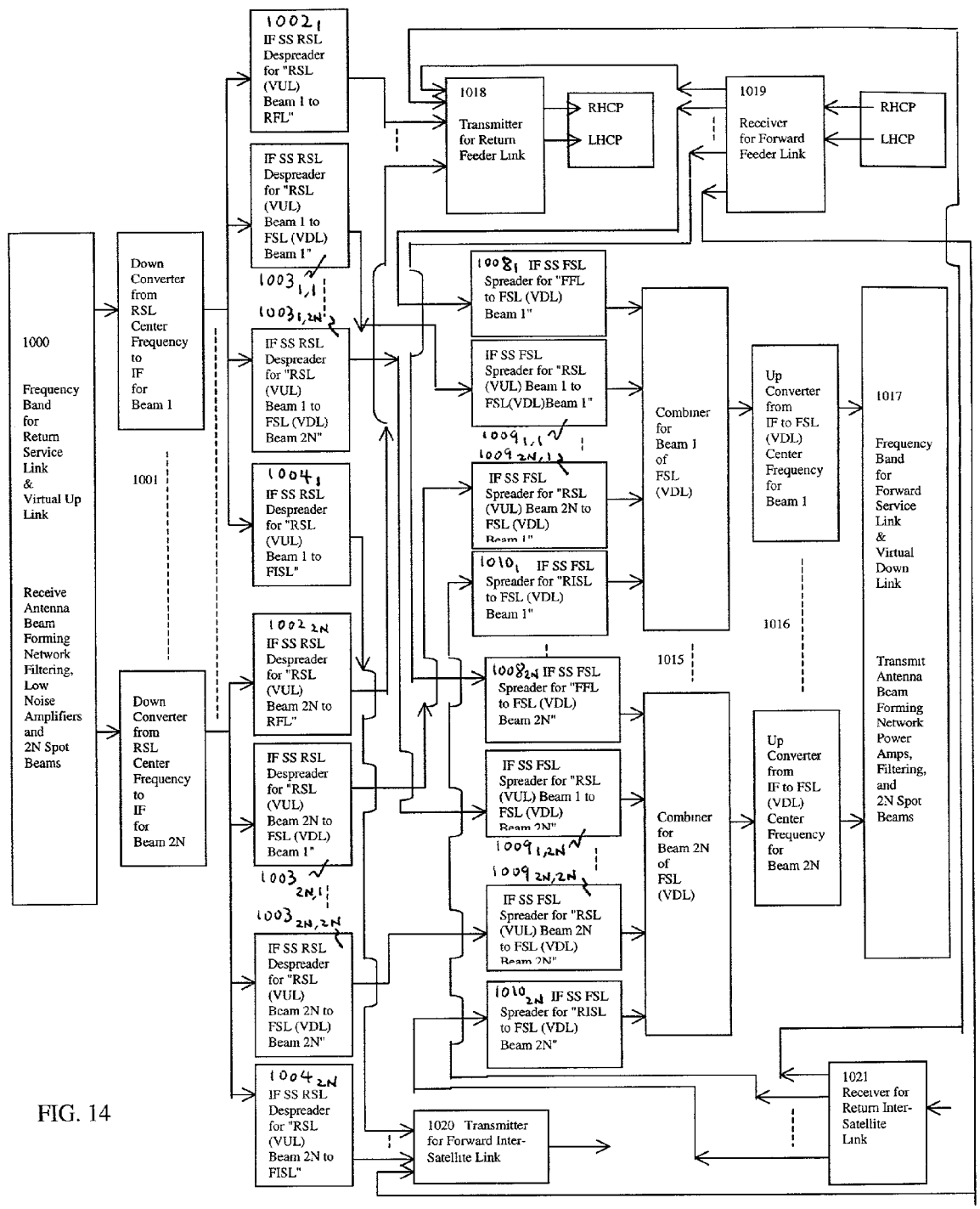
FIG. 14 is a block diagram of a structure of a satellite transponder that supports inter-satellite links for demultiplexing the channel blocks from the return service link and the virtual up link, as well as for multiplexing the channel blocks from the return service link and virtual up link with those from the forward feeder link and return inter-satellite link.

FIG. 14 shows a more detailed block diagram of the processing circuitry of FIG. 13 in accordance with the teachings of the present invention. FIG. 14 depicts a structure of the satellite 20B that also supports inter-satellite communication for code-division demultiplexing the SS-CDDA channel blocks received from each of the 2N antenna beams of the return service link 75 and the virtual up link 45. The received channel blocks have destinations that may include the return feeder link 25, the forward inter-satellite link 37B, as well as to each of the 2N antenna beams of the forward service link 65 and the virtual downlink 55.

The received channel blocks have been spread using a pre-determined set of orthogonal chip-coded waveforms at a chip-rate for spreading over the allocated bandwidth of the return service link 75.

The structure shown in FIG. 14 also includes a system for code-division multiplexing those SS-CDDA channel blocks received from each of the 2N antenna beams of the return service link 75, the virtual up link 45, the forward feeder link 15, and the return inter-satellite link 35B, that all have destination to the same antenna beam of the forward service link 65 and virtual down link 55.

The return service link 75 and the virtual uplink 45, including the SS-CDDA code division multiplexed channel blocks, are received through 2N beam antenna 1000. The 2N signals are filtered and amplified and the filtered and amplified signals are each downconverted from the center frequency of the return service link 75 or the virtual uplink 45, depending on the signal's origin, to an intermediate-frequency by downconverters $1001_1, \ldots, 1001_{2N}$.

For i=1, 2, ..., 2N, despreaders $1002_i$; $1003_{ij}$ (for j=1, 2, ..., 2N), and $1004_i$ regenerate the received channel blocks at an intermediate-frequency from the downconverters $1001_i$ for beam i by using the assigned subsets of the predetermined set of orthogonal chip coded waveforms used for spreading over the allocated bandwidth of the return service link 75. If the signals originated from the virtual uplink 45, despreaders $1002_i$; $1003_{ij}$ (for j=1, 2, ..., 2N), and $1004_i$ regenerate the received channel blocks at an intermediate-frequency from the downconverters $1001_i$ by using the assigned subsets of the predetermined set of orthogonal chip coded waveforms used for spreading over the allocated bandwidth of the virtual uplink 45.

For i=1, 2, ..., 2N, despreaders $1002_i$ are used to despread the signal originating from beam i of the return service link 75, having a destination of the return feeder link 25. The outputs of despreaders $1002_1, \ldots, 1002_{2N}$ are fed into the transmitter 1018 for the return feeder link 25.

For i=1, 2, ..., 2N, despreaders $1004_i$ despread signals originating from beam i of the return service link 75 or from beam i of the virtual uplink 45, having a destination of the forward inter-satellite link 37B.

For i=1, 2, ..., 2N, despreaders $1003_{ij}$, (for j=1, 2, ..., 2N) despread signals received from the downconverters $1001i$ for beam i of the return service link 75 with destinations beam j (for j=1, 2, . . . , 2N) of the forward service link 65, respectively.

Figure 15:
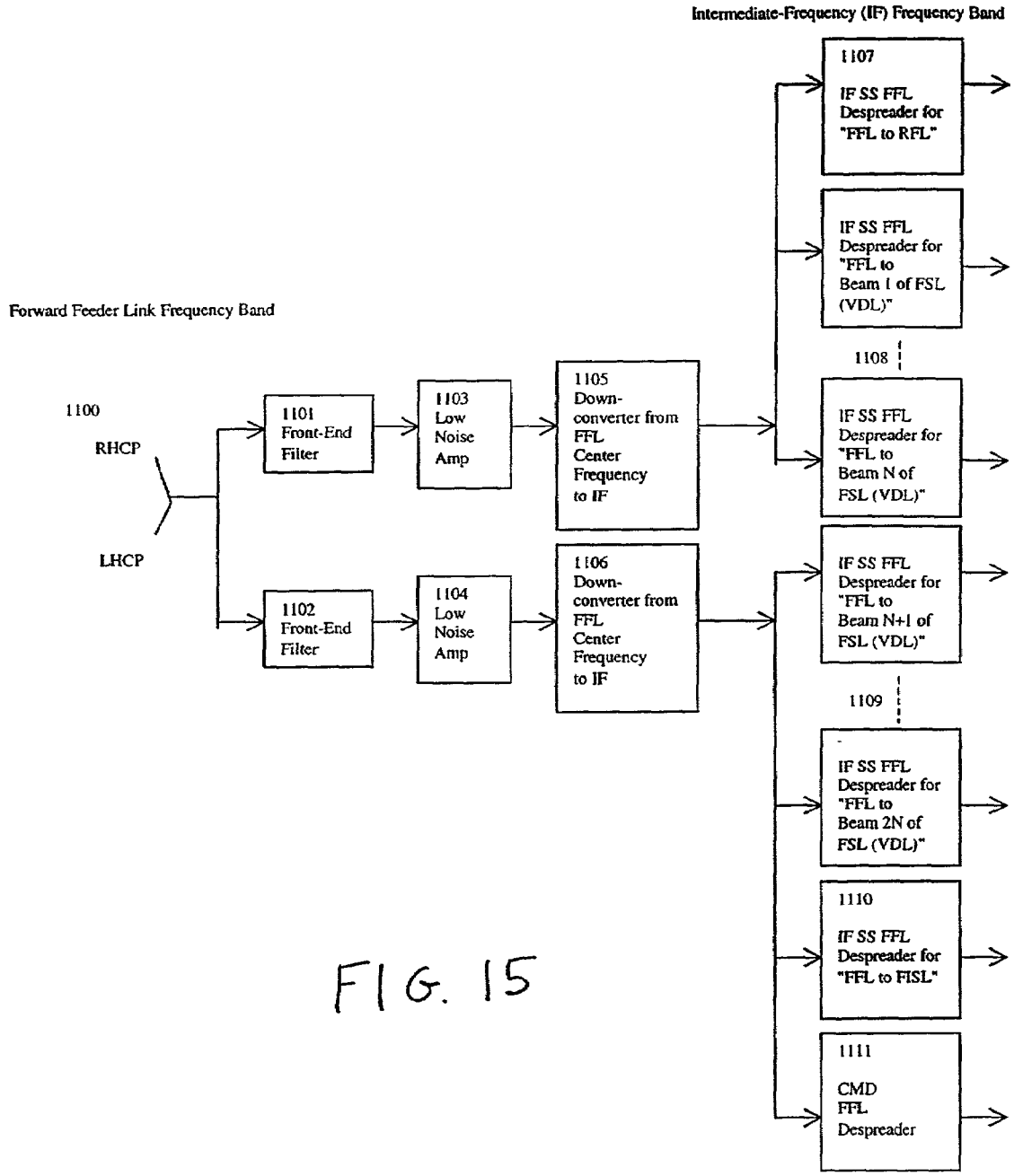
FIG. 15 is a block diagram of forward feeder link receiver 1019 as shown in FIG. 14 for demultiplexing the channel blocks received from the forward feeder link.

For i=1, 2, . . . , 2N, and j=1, 2, . . . , 2N, the output of despreaders $1003_{ij}$ is then respread by spreader $1009_{ij}$ As shown in greater detail in FIG. 15, the forward feeder link receiver 1019 receives 2N despread channel blocks originating from the forward feeder link 15 having destinations of each of the 2N antenna beams of the forward service link 65 or the virtual downlink 55. The 2N despread channel blocks from beam 1, . . . , beam 2N are respread by spreaders $1008_1, \ldots, 1008_{2N}$ over the frequency bandwidth of the forward service link 65, respectively.

Figure 17:
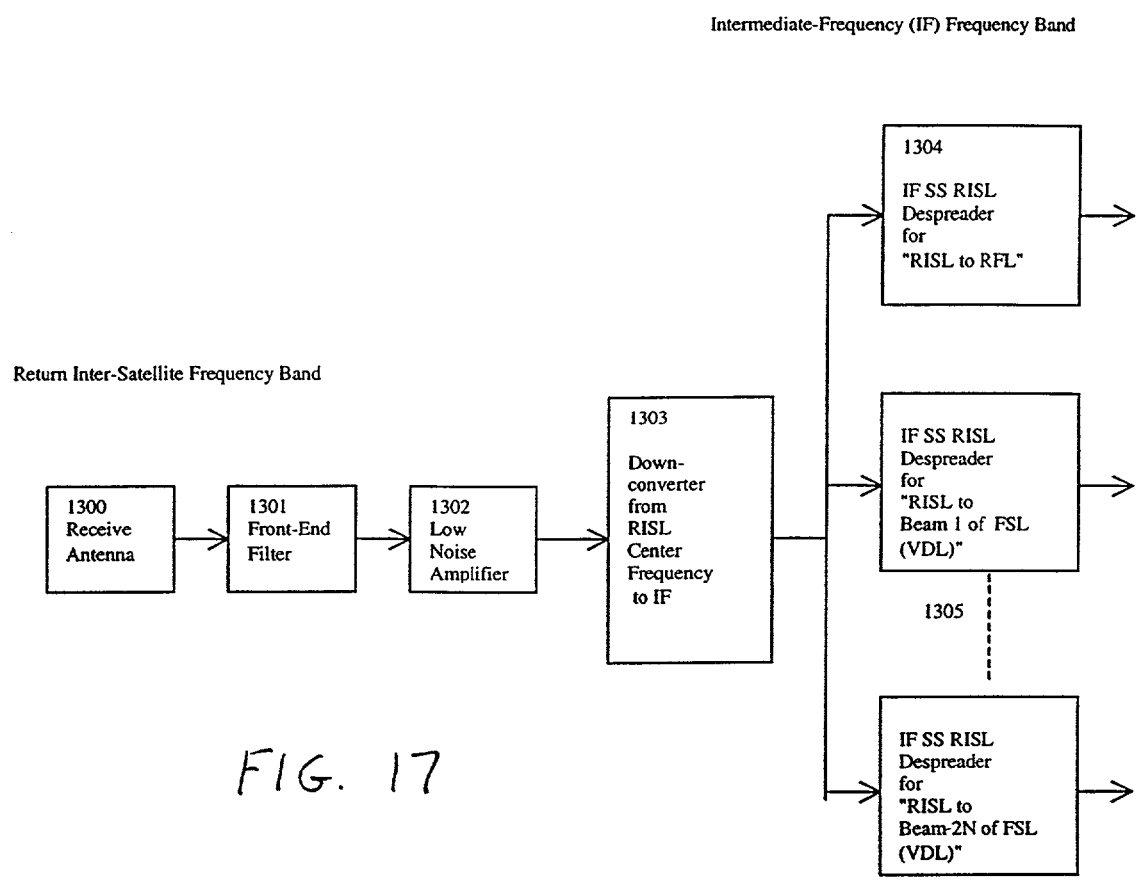
FIG. 17 is a block diagram of inter-satellite link receiver 1021 shown in FIG. 14 for demultiplexing the channel blocks received from the return inter-satellite link.

As shown in greater detail in FIG. 17, the return intersatellite link receiver 1021 of satellite 20B receives the spread channel blocks originating from the forawrd inter-satellite link transmitter 1020 of the satellite 20A, having destinations including each of the 2N antenna beams of the forward service link 65, the virtual down link 55, or the return feeder link 25. The 2N despread channel blocks are respread using the assigned subset of chip coded waveforms from a predetermined set of orthogonal chip coded waveforms. The predetermined set of waveforms is selected to enable spreading over the allocated bandwidth of the forward service link or the virtual downlink depending on the signals' destinations. The channel blocks destined for beam 1, . . . , beam 2N of the forward service link 65 or the virtual downlink 55 are respread by spreaders $1010_1, \ldots, 1010_{2N}$ respectively.

For j=1, 2, . . . , 2N, the outputs of despreaders $1008_j$, $1009_{ij}$ (for i=1, 2, . . . , 2N) and $1010_j$ are combined by combiner $1015j$. Each corresponding output of the combiners $1015_1$ through $1015_{2n}$ is upconverted by the corresponding upconverter of the bank of upconverters $1016_1$ through $1016_{2n}$ from an intermediate-frequency to the center frequency of the forward service link 65 or virtual downlink 55 depending on the destination of the signal.

The outputs of upconverters $1016_1$ through $1016_{2N}$ are fed to a beam forming network, power amplifiers and filters of the transmit antenna 1017 to generate the 2N spot beams for transmission in the forward service link 65 or the virtual down link 55.

FIG. 15 shows the detail of the receiver 1019 in FIG. 14. The receiver provides the satellite receiver structure for code-division demultiplexing the forward feeder link 15.

The forward feeder link 15, including the code-division multiplexed blocks, is received through a dual polarization (right-hand circular and left-hand circular) antenna 1100 at the allocated forward feeder link frequency band.

The code-division multiplexed channel blocks are segregated according to their polarization. RHCP and LHCP channel blocks are filtered by front end filters 1101 and 1102, respectively, and are amplified by low noise amplifiers 1103 and 1104, respectively.

The outputs of the low noise amplifiers 1103 and 1104 are downconverted from the center frequency of the forward feeder link frequency band to an intermediate-frequency by downconverters 1105 and 1106, respectively.

Despreaders 1107, $1108_1$ through $1108_N$, $1109_{N+1}$ through $1109_{2N}$, 1110, and 1111 regenerate the received channel blocks at an intermediate frequency by using the assigned subsets of the predetermined set of orthogonal chip coded waveforms used for spreading over the allocated bandwidth of the forward feeder link 15.

Despreader 1107 despreads signals originating in the forward feeder link 15 with a destination of the return feeder link 25. The forward feeder link signals are despread using the subset of waveforms assigned from the set of predetermined chip coded waveforms mentioned above.

Despreaders $1108_1$ through $1108_N$ are used to despread channel blocks originating from the forward feeder link 15 and having destinations including antenna beams 1 through N of the forward service link 65. The signals are despread using the subset of waveforms assigned from the set of predetermined chip-coded forward feeder link waveforms. In a further embodiment, despreaders $1108_1$ through $1108_N$ are used to despread channel blocks having destinations including 1 through N antenna beams of the virtual downlink 55.

Despreaders $1109_{N+1}$ through $1109_{2N}$ are used to despread channel blocks originating from the forward feeder link 15 and having destinations including N+1 through 2N antenna beams of the forward feeder link 15. The signals are despread using the subset assigned from the set of predetermined chip-coded forward feeder link waveforms. In a further embodiment, despreaders $1109_{N+1}$ through $1109_{2N}$ are used to despread channel blocks originating from the forward feeder link 15 and having destinations including N+1 through 2N antenna beams of the virtual downlink 55.

The despreader 1110 despreads channel blocks originating from the forward feeder link 15 and having a destination of the forward inter-satellite link 35A. The despreader 1110 utilizes an assigned subset from the set of predetermined orthogonal chip-coded forward feeder link waveforms.

The despreader 1111 despreads command channel blocks originating from the forward feeder link 15 using its assigned subset from the set of predetermined orthogonal chip-coded forward feeder link waveforms.

Figure 16:
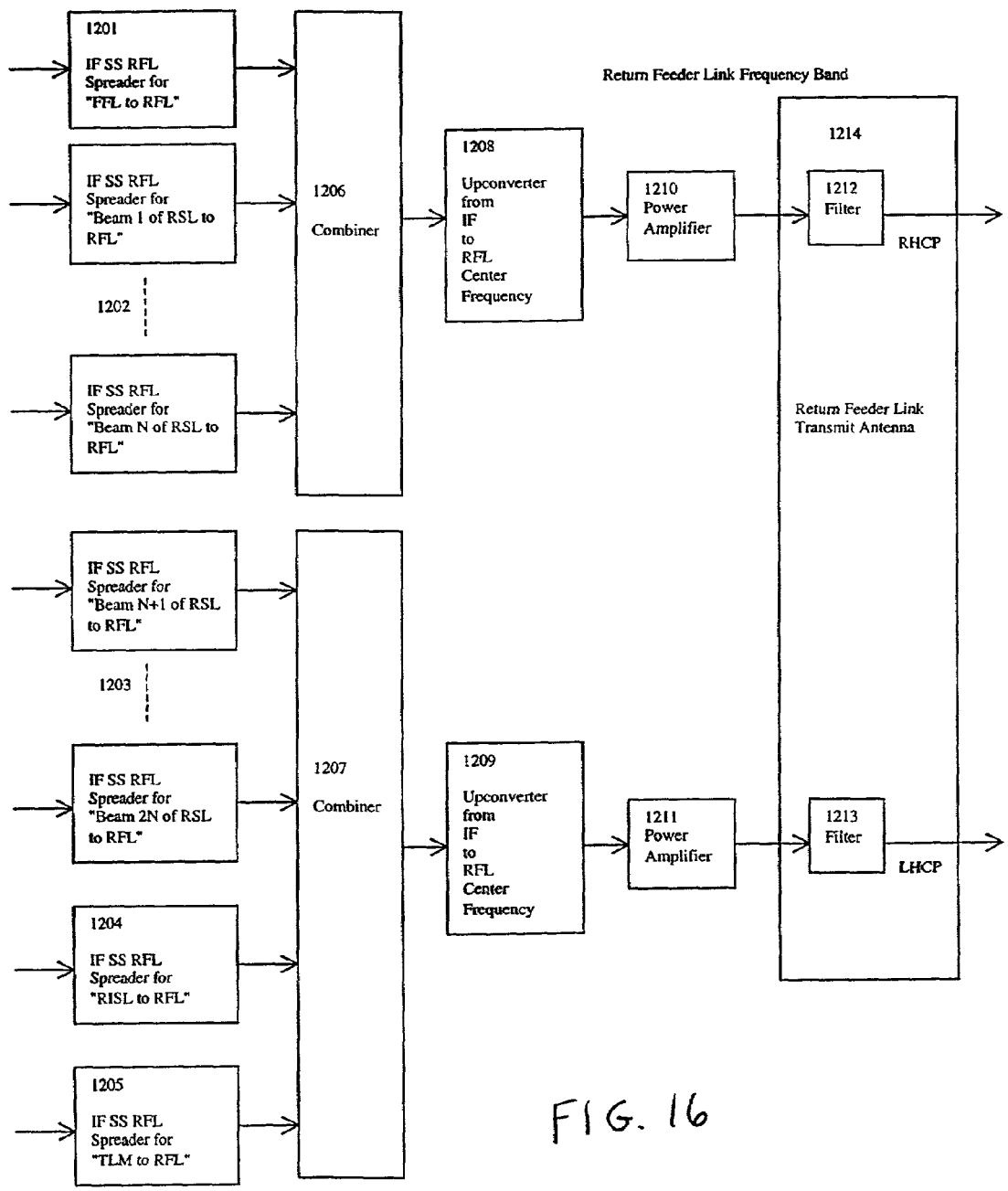
FIG. 16 is a block diagram of return feeder link transmitter 1018 depicted in FIG. 14 for multiplexing the channel blocks to be transmitted through the return feeder link.

FIG. 16 shows the satellite transmitter 1018 (FIG. 14) for the return feeder link 25 in greater detail. The transmitter 1018 includes structure for code-division multiplexing the regenerated channel blocks originating from the forward feeder link 15 and the return service link 75 and having a destination of the return feeder link 25. In a further embodiment the transmitter 1018 includes structure for code-division multiplexing the regenerated channel blocks originating from the 2N antenna beams of the virtual up link 45.

In FIG. 16, spreaders 1201, $1202_1$ through $1202_N$, $1203_{N+1}$ through $1203_{2N}$, 1204 and 1205 all spread their respective inputs at an appropriate intermediate frequency and perform spreading over the allocated bandwidth of the return feeder link 25.

The spreader 1201 spreads channel blocks having a destination of the return feeder link 25 using a first subset assigned from the set of predetermined orthogonal chip-coded waveforms for spreading over the allocated bandwidth of the return feeder link 25.

Spreaders $1202_1$ through $1202_N$ are used to spread channel blocks originating from 1 through N antenna beams of the return service link 75 and having a destination of the return feeder link 25. The channel blocks are spread using a second subset of waveforms assigned from the set of predetermined chip-coded return feeder link waveforms. In a further embodiment, spreaders $1202_1$ through $1202_N$ are used to spread channel blocks origination from 1 through N antenna beams of the virtual uplink 45.

Spreaders $1203_{N+1}$ through $1203_{2N}$ are used to spread channel blocks originating from N+1 through 2N antenna beams of the forward service link 65 using a third subset assigned from the set of predetermined chip-coded return feeder link waveforms. In a further embodiment, spreaders $1203_{N+1}$ through $1203_{2N}$ are used to spread channel blocks having the destinations of N+1 through 2N antenna beams of the virtual downlink 55.

The spreader 1204 spreads channel blocks originating from the return inter-satellite link 35 having a destination of the return feeder link 25.

The spreader 1205 spreads channel blocks originating from the telemetry channel (TLM) using a fifth subset assigned from the set of predetermined orthogonal chip-coded return feeder link waveforms.

The outputs of the spreaders 1201 and 1202$_1$ through 1202$_{2N}$ are combined by the combiner 1206 and the outputs of spreaders 1203$_{N+1}$ through 1203$_{2N}$, 1204, and 1205 are combined by the combiner 1207

The code-division multiplexed blocks of the output of the combiner 1206 and the combiner 1207 are upconverted from their intermediate-frequencies to the center frequency of the allocated forward feeder link frequency band by upconverters 1208 and 1209, respectively.

The outputs of the upconverters 1208 and 1209 are amplified by the power amplifiers 1210 and 1211, respectively, and the output of power amplifiers 1210 and 1211 are filtered by filters 1212 and 1213, respectively.

The output of filter 1212 is transmitted by the return feeder link transmit antenna 1214 using right-hand circular polarization (RHCP), while the output of filter 1213 is transmitted by the return feeder link transmit antenna 1214 using left-hand circular polarization (LHCP).

FIG. 17 shows the return inter-satellite link receiver 1021 of FIG. 14 in greater detail, in particular the receiver structure for code-division de-multiplexing the SS-CDDA channel blocks received from the return inter-satellite link 35.

The return inter-satellite link 35, including the SS-CDDA channel blocks, is received through antenna 1300 at the allocated return inter-satellite link frequency band.

The received code-division multiplexed blocks are filtered by the front-end filter 1301 and amplified by the low noise amplifier 1302. The output of low noise amplifier 1302 is downconverted from the center frequency of the return inter-satellite link frequency band to an intermediate frequency by downconverter 1303.

Despreaders 1304, and 1305$_1$ through 1305$_{2N}$, regenerate the received channel blocks at an intermediate frequency by using the assigned subsets of the predetermined set of orthogonal chip coded waveforms used for spreading over the allocated bandwidth of the return inter-satellite link 35.

Channel blocks having a destination of the return feeder link 25 are regenerated at an intermediate-frequency by the despreader 1304.

Despreaders 1305$_1$ through 1305$_{2N}$ are used to despread channel blocks originating from the return inter-satellite link 35 and having a destination of 1 through 2N antenna beams of the forward service link 65. Despreaders 1305$_1$ through 1305$_{2N}$ utilize the subset of waveforms assigned from the set of predetermined chip-coded return inter-satellite link waveforms. In a further embodiment, despreaders 1305$_1$ through 1305$_{2N}$ are used to despread channel blocks having a destination of 1 through 2N antenna beams of the virtual downlink 55

Figure 18:
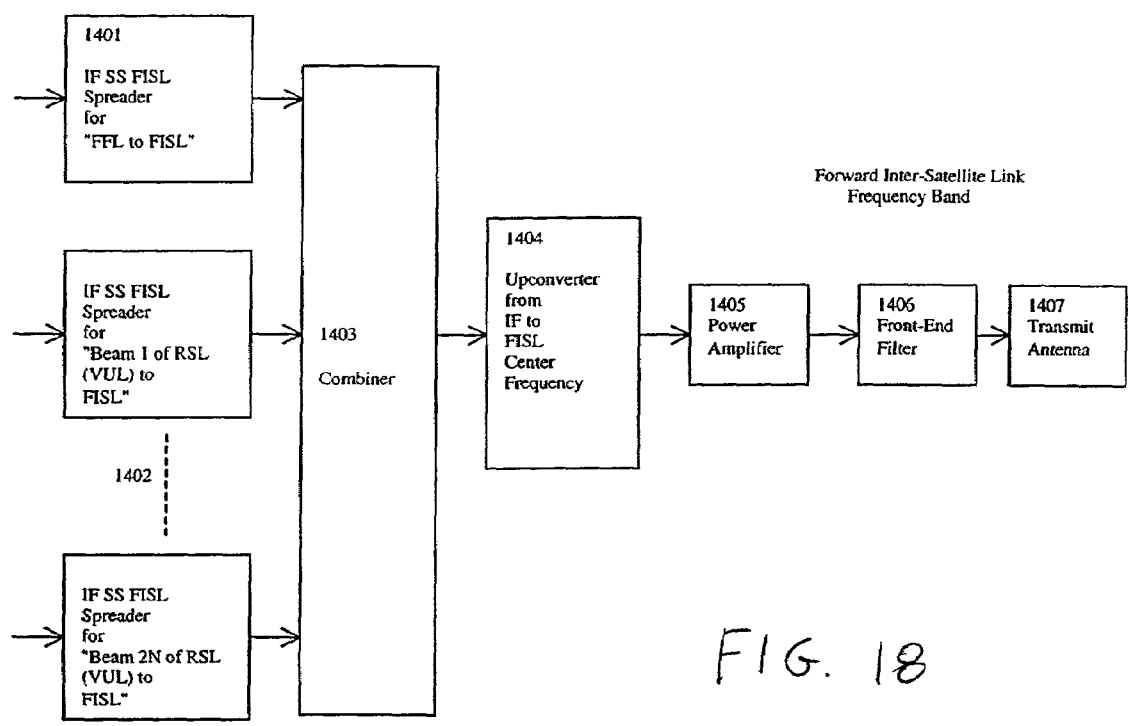
FIG. 18 is a block diagram of forward inter-satellite transmitter 1020 shown in FIG. 14 for multiplexing the code-division destination-access channel blocks to be transmitted through the forward inter-satellite link.

FIG. 18 shows the transmitter for the forward inter-satellite link 1020 of FIG. 14 in greater detail, in particular the satellite transmitter structure for code-division multiplexing channel blocks to be transmitted through the forward inter-satellite link 37.

A set of orthogonal chip coded waveforms is predetermined for code-division multiplexing the forward inter-satellite link channel blocks at a chip rate for spreading over a bandwidth allocated for the forward inter-satellite link 37. Subsets of the set of predetermined orthogonal chip coded waveforms are assigned for spreading the channel blocks according to their destination.

In FIG. 18, spreaders 1401, and 1402$_1$ through 1402$_{2N}$ all spread their respective inputs at an appropriate intermediate frequency and perform spreading over the allocated bandwidth of the forward inter-satellite link 37.

The spreader 1401 spreads channel blocks originating from the forward feeder link 15. Spreader 1401 uses a first subset of waveforms assigned from the set of predetermined orthogonal chip-coded waveforms for spreading over the allocated bandwidth of the forward inter-satellite link 37.

Spreaders 1402$_1$ through 1402$_{2N}$ are used to spread channel blocks originating from 1 through 2N antenna beams of the return service link 75 using a second subset of waveforms assigned from the set of predetermined chip-coded forward inter-satellite link waveforms. In a further embodiment, spreaders 1402$_1$ through 1402$_{2N}$ are used to spread channel blocks originating from 1 through 2N antenna beams of the virtual uplink 45.

The outputs of the spreaders 1401, and 1402$_1$ through 1402$_{2N}$ are combined by the combiner 1403. The code-division multiplexed blocks of the output of the combiner 1403 are upconverted from their intermediate-frequencies to the center frequency of the allocated forward inter-satellite link frequency band by upconverter 1404. The output of the upconverter 1404 is amplified by the power amplifier 1405. After amplification, the output of the power amplifier 1405 is filtered by front end filter 1406 and transmitted by the forward inter-satellite link transmit antenna 1407.

Although described in the context of a dual polarization system, the teachings of this invention may be practiced in a single polarization or non polarized system as well. Also, it should be realized that the specific numbers of signal channels, channel blocks, spot beams, frequencies, bandwidths, etc. are exemplary, and are not to be construed in a limiting sense upon the practice of this invention. It should also be realized that the teachings of this invention may be practiced without including the CMD or TLM channels or channel blocks in the multiplexing and de-multiplexing systems.

Although described in the context of a satellite system with multiple satellites and gateways, the teachings of this invention may be practiced in any satellite system comprising at least one gateway and at least one satellite. The number of gateways, satellites, virtual gateways, user terminals, etc., are not to be construed as limitations in practicing this invention.

Thus, while the invention has been particularly shown and described with respect to preferred embodiments thereof, it will be understood by those skilled in the art that changes in form and details may be made therein without departing from the scope and spirit of the invention.

We claim:

1. A method for processing communications in a satellite telecommunications system comprising the steps of:

providing a gateway and a satellite coupled together through at least one feeder link, said feeder link conveying a plurality of channel blocks;

providing code division multiplexed channel blocks from said plurality of channel blocks using a predetermined individual spreading waveform selected to indicate an origin and a destination of each of said plurality of channel blocks;

transmitting said code division multiplexed channel blocks; and, routing individual ones of said code division multiplexed channel blocks to their destination in accordance with the individual predetermined spreading waveforms.

2. The method of claim 1, wherein said at least one feeder link is a return feeder link.

3. The method of claim 1, wherein said at least one feeder link is a forward feeder link.

4. The method of claim 3 wherein said destination comprises at least a beam of a forward service link.

5. A method for processing communications in a satellite telecommunications system comprising the steps of:
    providing a gateway and a satellite coupled together through at least one feeder link, said feeder link having a predetermined bandwidth and a predetermined center frequency, and conveying a plurality of channel blocks;
    code division multiplexing each of said plurality of channel blocks using a predetermined spreading waveform selected to achieve a spreading bandwidth corresponding to said predetermined bandwidth and to also to indicate an origin and a destination of each of said plurality of channel blocks; and
    upconverting said plurality of code division multiplexed channel blocks such that said plurality of code division multiplexed channel blocks have a center frequency corresponding to said predetermined center frequency.

6. The method of claim 5, further comprising, after the step of upconverting, the steps of:
    transmitting said code division multiplexed channel blocks;
    receiving said code division multiplexed channel blocks;
    de-multiplexing said plurality of channel blocks; and,
    routing ones of said plurality of channel blocks to their destination determined from said predetermined spreading waveform.

7. The method of claim 5, wherein said at least one feeder link is a forward feeder link.

8. The method of claim 5, wherein said at least one feeder link is a return feeder link.

9. A method for processing communications in a satellite telecommunications system comprising the steps of:
    providing a satellite and a user terminal coupled together through at least one service link, said service link having a predetermined bandwidth and a predetermined center frequency, and conveying a plurality of signals;
    code division multiplexing each of said plurality of signals using a predetermined spreading waveform selected to achieve a spreading bandwidth corresponding to said predetermined bandwidth and to indicate an origin and a destination of each of said plurality of signals; and,
    upconverting said plurality of code division multiplexed signals such that said plurality of code division multiplexed signals have a center frequency corresponding to said predetermined center frequency.

10. The method of claim 9, further comprising, after the step of upconverting, the steps of:
    transmitting said code division multiplexed signals;
    receiving said code division multiplexed signals; and,
    de-multiplexing said code division multiplexed signals.

11. The method of claim 9, wherein said at least one service link is a forward service link.

12. The method of claim 9, wherein said at least one service link is a return service link.

13. The method of claim 12, further comprising routing each of said plurality of signals to their destinations determined from said predetermined spreading waveform.

14. A method for processing communications in a satellite telecommunications system comprising the steps of:
    providing a satellite and a virtual gateway coupled together through at least one virtual link, said virtual link having a predetermined bandwidth and a predetermined center frequency, and conveying a plurality of signals;
    providing a plurality of code division multiplexed signals using a predetermined spreading waveform selected to achieve a spreading bandwidth corresponding to said predetermined bandwidth and to indicate an origin and a destination of each of said plurality of signals; and,
    upconverting said code division multiplexed communication signals such that said plurality of code division multiplexed signals have a center frequency corresponding to said predetermined center frequency.

15. The method of claim 14, further comprising, after the step of upconverting, the steps of:
    transmitting said code division multiplexed signals;
    receiving said code division multiplexed signals; and
    de-multiplexing said communication signals.

16. The method of claim 14, wherein said at least one virtual link is a virtual downlink.

17. The method of claim 14, wherein said at least one virtual link is a virtual uplink.

18. The method of claim 14, further comprising routing said each of said plurality of signals to their destinations determined from said predetermined spreading waveform.

19. A method for processing communications in a satellite telecommunications system comprising the steps of:
    providing a first satellite and a second satellite coupled together through at least one inter-satellite link having a predetermined bandwidth and a predetermined center frequency, said inter-satellite link for conveying communication signals between said satellites;
    code division multiplexing said communication signals using a predetermined spreading waveform selected to achieve a spreading bandwidth corresponding to said predetermined bandwidth and to indicate an origin and a destination of each of said communication signals; and,
    upconverting said code division multiplexed communication signals such that said communication signals have a center frequency corresponding to said predetermined center frequency.

20. The method of claim 19, further comprising, after the step of upconverting, the steps of:
    transmitting said code division multiplexed communication signals from said first satellite;
    receiving said code division multiplexed communication signals at said second satellite;
    de-multiplexing said communication signals; and,
    routing said communication signals to their destinations determined from said predetermined spreading waveform.

21. The method of claim 19, wherein said at least one inter-satellite link is a forward inter-satellite link.

22. The method of claim 19, wherein said at least one inter-satellite link is a return inter-satellite link.

23. An apparatus for processing communications in a satellite telecommunications system comprising:
    a gateway;
    at least one feeder link for conveying a plurality of channel blocks, said feeder link having a predetermined bandwidth and a predetermined center frequency;
    a satellite coupled with said gateway through said at least one feeder link;

circuitry in each of said satellite and said gateway for code division multiplexing each of said plurality of channel blocks using an individual predetermined spreading waveform selected to achieve a spreading bandwidth corresponding to said predetermined bandwidth and to indicate an origin and a destination of each of said plurality of channel blocks; and, circuitry in each of said satellite and said gateway for upconverting said plurality of code division multiplexed channel blocks such that said plurality of code division multiplexed channel blocks have a center frequency corresponding to said predetermined center frequency.

24. The apparatus of claim 23, wherein said gateway and said satellite each further comprise circuitry for de-multiplexing said plurality of channel blocks and using the de-multiplexed channel blocks in a conventional manner.

25. The apparatus of claim 23, wherein said satellite further comprises circuitry for de-multiplexing said plurality of channel blocks and for routing said each of said plurality of channel blocks to their destination in accordance with the individual predetermined spreading waveform.

26. The apparatus of claim 23, wherein said at least one feeder link is a forward feeder link.

27. The apparatus of claim 23, wherein said at least one feeder link is a return feeder link.

28. An apparatus for generating communications in a satellite telecommunications system comprising:
a satellite;
at least one service link for conveying a plurality of signals, said service link having a predetermined bandwidth and a predetermined center frequency;
a user terminal coupled with said satellite through said at least one service link;
circuitry in each of said satellite and said user terminal for code division multiplexing each of said plurality of signals using a predetermined spreading waveform selected to achieve a spreading bandwidth corresponding to said predetermined bandwidth and to indicate an origin and a destination of each of said plurality of signals; and,
circuitry in each of said satellite and said user terminal for upconverting said plurality of code division multiplexed signals such that said plurality of code division multiplexed signals have a center frequency corresponding to said predetermined center frequency.

29. The apparatus of claim 28, wherein said satellite and said user terminal each further comprise circuitry for de-multiplexing said plurality of signals and using the de-multiplexed signals in a conventional manner.

30. The apparatus of claim 28, wherein said at least one service link is a forward service link.

31. The apparatus of claim 28, wherein said at least one service link is a return service link.

32. The apparatus of claim 28, wherein said satellite further comprises circuitry for de-multiplexing said plurality of signals and for routing said each of said plurality of signals to their destination in accordance with the predetermined spreading waveform.

33. An apparatus for generating communications in a satellite telecommunications system comprising:
a satellite;
at least one virtual link for conveying a plurality of signals, said virtual link having a predetermined bandwidth and a predetermined center frequency;
a virtual gateway coupled with said satellite through said at least one virtual link;
circuitry in each of said satellite and said virtual gateway for code division multiplexing each of said plurality of signals using a predetermined spreading waveform selected to achieve a spreading bandwidth corresponding to said predetermined bandwidth and to indicate an origin and a destination of each of said plurality of signals; and,
circuitry in each of said satellite and said virtual gateway for upconverting said plurality of code division multiplexed signals such that said plurality of code division multiplexed signals have a center frequency corresponding to said predetermined center frequency.

34. The apparatus of claim 33, wherein said satellite and said virtual gateway each further comprise circuitry for de-multiplexing said plurality of signals using the de-multiplexed signals in a conventional manner.

35. The apparatus of claim 33, wherein said at least one virtual link is a virtual downlink.

36. The apparatus of claim 33, wherein said at least one virtual link is a virtual uplink.

37. The apparatus of claim 33, wherein said satellite further comprises circuitry for de-multiplexing said plurality of signals and for routing said each of said plurality of signals to their destination in accordance with the predetermined spreading waveform.

38. An apparatus for generating communications in a satellite telecommunications system comprising:
a first satellite;
a second satellite coupled with said first satellite through at least one inter-satellite link for conveying communication signals between said satellites, said inter-satellite link having a predetermined bandwidth and a predetermined center frequency;
circuitry in each of said first satellite and said second satellite for code division multiplexing each of said communication signals using a predetermined spreading waveform selected to achieve a spreading bandwidth corresponding to said predetermined bandwidth and to indicate an origin and a destination of each of said communication signals; and,
circuitry in each of said first satellite and said second satellite for upconverting said communication signals such that said plurality of code division multiplexed communication signals have a center frequency corresponding to said predetermined center frequency.

39. The apparatus of claim 38, wherein said first satellite and said second satellite each further comprise circuitry for de-multiplexing said communication signals and for using the de-multiplexed communication signals in a conventional manner.

40. The apparatus of claim 38, wherein said at least one inter-satellite link is a forward inter-satellite link.

41. The apparatus of claim 38, wherein said at least one inter-satellite link is a return inter-satellite link.

42. A method for processing communications in a satellite telecommunications system comprising the steps of:
providing a gateway and a satellite coupled together through at least one feeder link, said feeder link conveying a plurality of channel blocks;
providing code division multiplexed channel blocks using a predetermined spreading waveform selected to indicate an origin and a destination of each of said plurality of channel blocks, wherein said destination is a beam of a forward service link;
transmitting said code division multiplexed channel blocks; and,
routing individual ones of said channel blocks to their destination in accordance with the predetermined spreading waveform.

* * * * *